US012022138B2

(12) United States Patent
AlDarabsah et al.

(10) Patent No.: US 12,022,138 B2
(45) Date of Patent: Jun. 25, 2024

(54) MODEL SERVING FOR ADVANCED FREQUENCY MANAGEMENT

(71) Applicant: Tubi, Inc., San Francisco, CA (US)

(72) Inventors: Khaldun Matter Ahmad AlDarabsah, Santa Clara, CA (US); Hailong Geng, Beijing (CN); Yu Tao Zhao, Olympia, WA (US); Yoshihiro Tanaka, Redmond, WA (US); Haofei Wang, Redwood City, CA (US); Mark Alden Rotblat, Lafayette, CA (US); Jaya Kawale, San Jose, CA (US); Chang She, San Francisco, CA (US); Marios Assiotis, Park City, UT (US); Joseph Gallagher, San Francisco, CA (US); Chiyu Zhong, Bloomington, IN (US); Amir Mazaheri, Mountain View, CA (US)

(73) Assignee: Tubi, Inc., San Francisco, CA (US)

( * ) Notice: Subject to any disclaimer, the term of this patent is extended or adjusted under 35 U.S.C. 154(b) by 187 days.

(21) Appl. No.: 17/676,760

(22) Filed: Feb. 21, 2022

(65) Prior Publication Data

US 2022/0405809 A1    Dec. 22, 2022

Related U.S. Application Data

(60) Provisional application No. 63/213,177, filed on Jun. 21, 2021.

(51) Int. Cl.
*G06Q 30/00* (2023.01)
*G06Q 30/0241* (2023.01)
(Continued)

(52) U.S. Cl.
CPC ... *H04N 21/23424* (2013.01); *G06Q 30/0245* (2013.01); *G06Q 30/0251* (2013.01);
(Continued)

(58) Field of Classification Search
CPC ........... H04N 21/23424; H04N 21/251; H04N 21/26208; H04N 21/23418; H04N 21/812;
(Continued)

(56) References Cited

U.S. PATENT DOCUMENTS

| 8,776,111 B1 | 7/2014 | Eldering et al. |
| 9,215,123 B1 | 12/2015 | Fears et al. |

(Continued)

OTHER PUBLICATIONS

"Mediacampaign—a multimodal semantic analysis system for advertisement campaign detection". IEEE. 2008. (Year: 2008).*

*Primary Examiner* — Maria V Vanderhorst
(74) *Attorney, Agent, or Firm* — Redbrick IP, P.C.

(57) ABSTRACT

Systems and methods for entity detection using artificial intelligence, including: a deep learning model service configured to: select and analyze a set of frames from a media item to determine a set of candidate brand-probability pairs; a voting engine configured to: determining that a first brand-probability pair of a set of candidate brand-probability pairs based on at least one obtained hyperparameter value does not meet a threshold for determining whether candidate brand-probability pairs are to be included in a result set; excluding the first brand-probability pair from the result set based on the determination; sorting the result set; and selecting at least one final brand-probability pair from the result set; and an offline transcoding service configured to: store the final brand-probability pair in a repository with a relation to an identifier of the media item.

17 Claims, 11 Drawing Sheets

(51) Int. Cl.
*G06Q 30/0242* (2023.01)
*G06Q 30/0251* (2023.01)
*G06V 10/70* (2022.01)
*G06V 10/774* (2022.01)
*G06V 10/776* (2022.01)
*G06V 20/40* (2022.01)
*H04N 21/234* (2011.01)
*H04N 21/25* (2011.01)
*H04N 21/262* (2011.01)
*G05B 19/418* (2006.01)

(52) U.S. Cl.
CPC ......... *G06Q 30/0277* (2013.01); *G06V 10/70* (2022.01); *G06V 10/774* (2022.01); *G06V 10/776* (2022.01); *G06V 20/41* (2022.01); *G06V 20/46* (2022.01); *H04N 21/251* (2013.01); *H04N 21/26208* (2013.01)

(58) Field of Classification Search
CPC ......... G06Q 30/0245; G06Q 30/0251; G06Q 30/0277; G06V 10/70; G06V 10/774; G06V 10/776; G06V 20/41; G06V 20/46
See application file for complete search history.

(56) References Cited

U.S. PATENT DOCUMENTS

| | | |
|---|---|---|
| 9,277,275 B1 | 3/2016 | Arini |
| 9,465,604 B1 | 10/2016 | Burgyan et al. |
| 9,563,928 B1 | 2/2017 | Sokolowski et al. |
| 10,007,863 B1 * | 6/2018 | Pereira ............... G06V 10/764 |
| 10,671,852 B1 * | 6/2020 | Zadeh ..................... G06F 3/00 |
| 10,846,737 B1 | 11/2020 | Matarese et al. |
| 10,887,421 B2 | 1/2021 | Moassoudi |
| 11,463,540 B2 | 10/2022 | Massoudi |
| 2001/0020255 A1 | 9/2001 | Hofmann et al. |
| 2002/0129368 A1 | 9/2002 | Schlack et al. |
| 2002/0178126 A1 | 11/2002 | Beck et al. |
| 2003/0191726 A1 * | 10/2003 | Kirshenbaum ....... G06F 18/254 706/46 |
| 2003/0235184 A1 | 12/2003 | Dorenbosch et al. |
| 2005/0101321 A1 | 5/2005 | Ikeda et al. |
| 2005/0177835 A1 | 8/2005 | Chickering |
| 2006/0075019 A1 | 4/2006 | Donovan et al. |
| 2006/0253323 A1 | 11/2006 | Phan et al. |
| 2007/0233671 A1 | 10/2007 | Oztekin et al. |
| 2008/0082604 A1 | 4/2008 | Mansour et al. |
| 2008/0259906 A1 | 10/2008 | Shkedi |
| 2009/0006214 A1 | 1/2009 | Lerman |
| 2009/0013051 A1 | 1/2009 | Renschler et al. |
| 2009/0064301 A1 | 3/2009 | Sachdeva |
| 2009/0089161 A1 | 4/2009 | Alo et al. |
| 2009/0106785 A1 | 4/2009 | Pham |
| 2009/0129479 A1 | 5/2009 | Yellamraju |
| 2009/0204478 A1 | 8/2009 | Kaib et al. |
| 2010/0037255 A1 | 2/2010 | Sheehan |
| 2010/0151816 A1 | 6/2010 | Besehanic et al. |
| 2010/0211967 A1 | 8/2010 | Ramaswamy et al. |
| 2010/0246981 A1 | 9/2010 | Hu et al. |
| 2011/0040636 A1 | 2/2011 | Simmons et al. |
| 2011/0093335 A1 | 4/2011 | Fordyce et al. |
| 2011/0103374 A1 | 5/2011 | LaJoie et al. |
| 2011/0113116 A1 | 5/2011 | Burdette et al. |
| 2011/0125594 A1 | 5/2011 | Brown et al. |
| 2011/0167440 A1 | 7/2011 | Greenfield |
| 2011/0219229 A1 | 9/2011 | Cholas et al. |
| 2011/0246298 A1 | 10/2011 | Williams et al. |
| 2011/0252305 A1 | 10/2011 | Tschani et al. |
| 2011/0258049 A1 | 10/2011 | Ramer et al. |
| 2012/0007866 A1 | 1/2012 | Tahan |
| 2012/0016655 A1 | 1/2012 | Travieso |
| 2012/0029983 A1 | 2/2012 | Rodriguez et al. |
| 2012/0089455 A1 | 4/2012 | Belani et al. |
| 2012/0102169 A1 | 4/2012 | Yu et al. |
| 2012/0151079 A1 | 6/2012 | Besehanic et al. |
| 2012/0263385 A1 * | 10/2012 | van Zwol ............ G06V 10/757 382/201 |
| 2013/0110634 A1 | 5/2013 | Cochran et al. |
| 2013/0132856 A1 | 5/2013 | Binyamin et al. |
| 2013/0156269 A1 | 6/2013 | Matsui et al. |
| 2013/0198376 A1 | 8/2013 | Landa et al. |
| 2013/0227068 A1 | 8/2013 | Yasrebi et al. |
| 2013/0268951 A1 | 10/2013 | Wyatt et al. |
| 2013/0311649 A1 | 11/2013 | DeFrancesco et al. |
| 2013/0346202 A1 | 12/2013 | Kouladjie |
| 2014/0059636 A1 | 2/2014 | Patel |
| 2014/0075014 A1 | 3/2014 | Chourey |
| 2014/0101686 A1 | 4/2014 | Kitts |
| 2014/0101739 A1 | 4/2014 | Li et al. |
| 2014/0143052 A1 | 5/2014 | Stryker |
| 2014/0157289 A1 | 6/2014 | Aarts et al. |
| 2014/0181243 A1 | 6/2014 | Nieuwenhuys |
| 2014/0282642 A1 | 9/2014 | Needham et al. |
| 2014/0372415 A1 | 12/2014 | Fernandez-Ruiz |
| 2014/0379911 A1 | 12/2014 | Fayssal et al. |
| 2015/0055931 A1 * | 2/2015 | Koivukangas ......... H04N 5/772 386/228 |
| 2015/0082345 A1 | 3/2015 | Archer et al. |
| 2015/0206198 A1 | 7/2015 | Marshall |
| 2015/0234564 A1 | 8/2015 | Snibbe et al. |
| 2015/0271540 A1 | 9/2015 | Melby et al. |
| 2015/0382075 A1 | 12/2015 | Neumeier et al. |
| 2016/0358099 A1 | 12/2016 | Sturlaugson |
| 2016/0358209 A1 | 12/2016 | Khozani et al. |
| 2016/0360289 A1 | 12/2016 | Santoro et al. |
| 2017/0064411 A1 | 3/2017 | Goli et al. |
| 2017/0193560 A1 * | 7/2017 | Bhalgat ............. G06Q 30/0277 |
| 2017/0278289 A1 | 9/2017 | Marino |
| 2018/0349391 A1 | 12/2018 | Chechik |
| 2019/0138810 A1 | 5/2019 | Chen et al. |
| 2019/0295122 A1 | 9/2019 | Kumar |
| 2020/0160389 A1 | 5/2020 | Yang |
| 2020/0242364 A1 | 7/2020 | Zadeh |
| 2021/0195286 A1 * | 6/2021 | Lohumi ............. G06F 18/2451 |

* cited by examiner

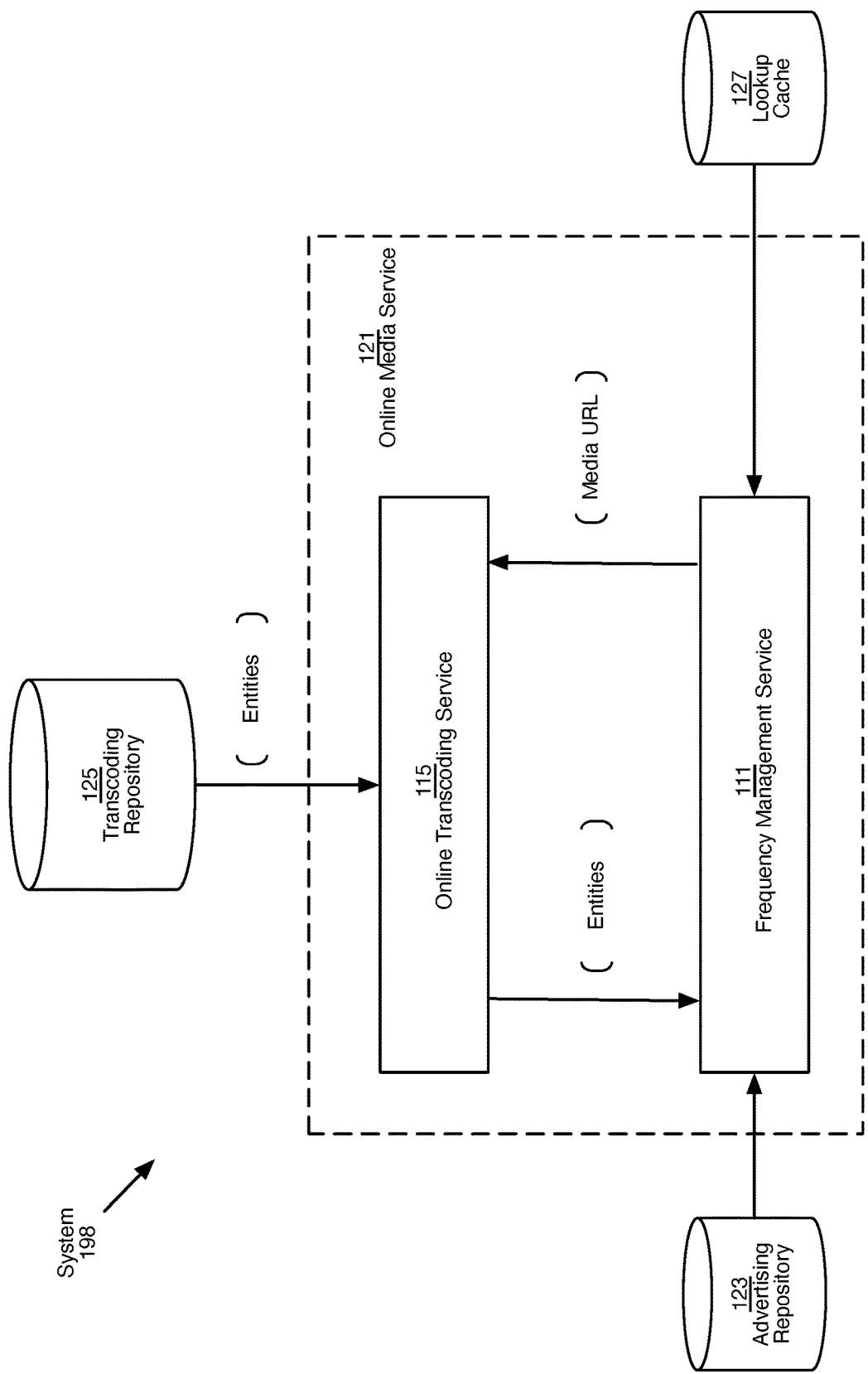

```
1   procedure ApplyVoting(candidates, score_threshold, count_threshold)
2       stats = {}
3       results = {}
4       for candidate in candidates do
5           label = candidate[label]   // label is the identifier of the entity
6           score = candidate[score]   // confidence score
7           if score >= score_threshold then
8               stats[label] = stats[label]+1   // increment count for this label
9           end if
10      end for
11      for label in stats do
12          count = stats[label]
13          if count >= count_threshold then
14              results[label] = count   // count of appearance of each entity
15          end if
16      end for
17      sort results descending by count
18  end procedure
```

Figure 7

MODEL SERVING FOR ADVANCED FREQUENCY MANAGEMENT

CROSS-REFERENCE TO RELATED APPLICATIONS

This application claims benefit of U.S. Provisional Patent Application No. 63/213,177, filed on Jun. 21, 2021, and entitled "ADVANCED FREQUENCY MANAGEMENT." U.S. Provisional Patent Application No. 63/213,177 is incorporated by reference herein, in its entirety.

CROSS-REFERENCE TO RELATED APPLICATION

This application is related to, and herein incorporates by reference for all purposes, U.S. patent application Ser. No. 17/676,759, filed Feb. 21, 2022, entitled "TRAINING DATA GENERATION FOR ADVANCED FREQUENCY MANAGEMENT", including inventor Khaldun Matter Ahmad AlDarabsah. This application is related to, and herein incorporates by reference for all purposes, U.S. patent application Ser. No. 17/676,763, filed Feb. 21, 2022, entitled "MACHINE LEARNING TECHNIQUES FOR ADVANCED FREQUENCY MANAGEMENT", including inventor Khaldun Matter Ahmad AlDarabsah.

BACKGROUND

As the number of Internet-connected devices continues to grow, online advertisers have struggled to adapt. The Internet of things (IoT) promises vast new possibilities for traditionally non-connected devices. Refrigerators, microwaves, home entertainment systems, and a variety of other devices have increased the available inventory of advertising platforms dramatically. As advertising networks, demand-side platforms (DSPs), and other stakeholders adapt to this influx of new inventory, they are faced with new challenges and opportunities that legacy systems are not capable of addressing.

From the user perspective, consuming advertisements across this new range of devices at this scale is fractured and sometimes suboptimal. Users are inundated with advertisements. Advances in advertising creatives and the integration of ads within the product experience have helped to enable advertising to augment and not detract from the user experience. However, without new methods of optimization, personalization, and integration of the various advertising platforms across the technology stack, this end-user experience can degrade.

Despite common misconceptions, it is the objective of advertisers, publishers, and other stakeholders to reduce friction and augment the user experience of the connected products and services that users enjoy.

SUMMARY

In general, in one aspect, embodiments relate to systems and methods for programmatic generation of training data, including: a training data generation engine configured to: identify an image asset corresponding to an entity; identify a training video; select a consecutive subset of frames of the training video based on a procedure for ranking frames on their candidacy for overlaying content; for at least one frame of the subset of frames: perform an augmentation technique on the identified logo image to generate an augmented image asset; overlay at least one variation of the image asset, including the augmented image asset, onto each of the subset of frames to generate a set of overlayed frames; and generate an augmented version of the training video including the overlayed frames; and a model training engine configured to: train an artificial intelligence model for entity detection using the augmented version of the training video.

In general, in one aspect, embodiments relate to systems and methods for entity detection using artificial intelligence, including: a deep learning model service configured to: select and analyze a set of frames from a media item to determine a set of candidate brand-probability pairs; a voting engine configured to: determining that a first brand-probability pair of a set of candidate brand-probability pairs based on at least one obtained hyperparameter value does not meet a threshold for determining whether candidate brand-probability pairs are to be included in a result set; excluding the first brand-probability pair from the result set based on the determination; sorting the result set; and selecting at least one final brand-probability pair from the result set; and an offline transcoding service configured to: store the final brand-probability pair in a repository with a relation to an identifier of the media item.

In general, in one aspect, embodiments relate to systems and methods for frequency management, including: an online media service configured to: receive a request for a media item, the request including a recipient identifier; identify a set of candidate media items ranked by a set of matching criteria; a frequency management service configured to: perform a query against a lookup service, where the query includes (i) an entity identifier of at least one candidate media item of the set of candidate media items, and (ii) the recipient identifier; receive a response from the lookup service including a quantity of impressions associated with the entity identifier and the recipient identifier; identify a predefined frequency threshold; determine that the frequency threshold is exceeded and exclude the at least one candidate media item from a result set based on the determination; and provide the result set including an identifier of at least one other candidate media item.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

FIG. 1D illustrates a block diagram of a system for advanced frequency management in accordance with one or more embodiments.

FIG. 7 shows a pseudocode voting algorithm in accordance with one or more embodiments.

DETAILED DESCRIPTION

Figure 1A:
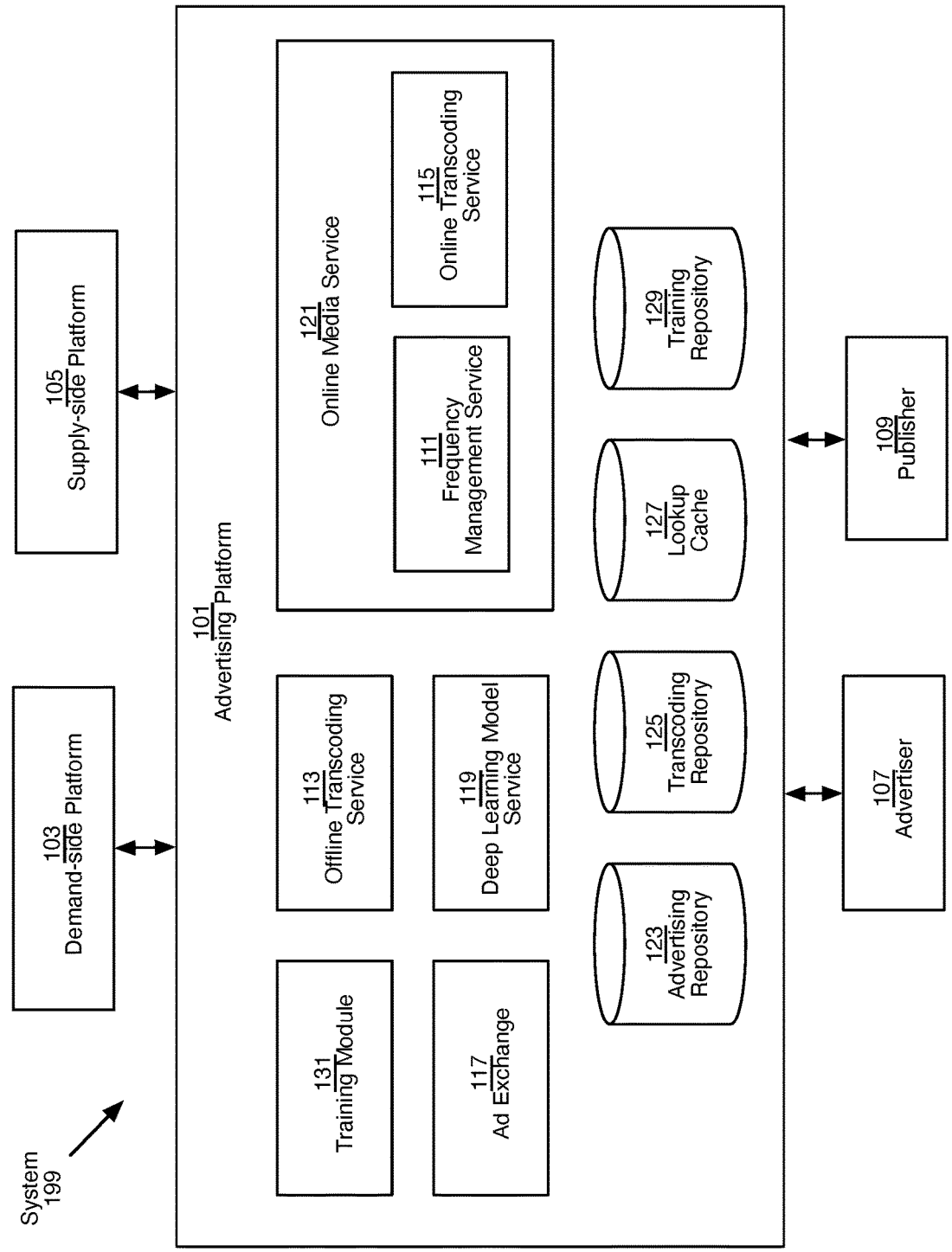
FIG. 1A illustrates a block diagram of a system and platform for programmatic advertising in accordance with one or more embodiments.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications, and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide methods and systems for programmatic generation of training data. A set of media items is obtained and analyzed in order to identify portions that are suitable for augmentation with representations of a predefined entity. For example, frames of a video may be selected and overlayed with a logo image of a brand. The overlayed images may then be utilized to train an artificial intelligence model for purposes of object detection, and specifically, the detection of entity data relating to brands (e.g., logos) used in programmatic advertising and other processes. The methods and systems may apply deep neural learning, or machine learning, to perform various embodiments of the invention (e.g., generating models, comparing models, etc.).

Embodiments of the present disclosure provide methods and systems for ingestion, transcoding, and analysis of a media item. A request to ingest a media item is received. Based on the request, the media item is transcoded in a process that may involve analyzing segments of the media item by an artificial intelligence model trained for object detection on one or more specific entity types (e.g., logo images). Based on analysis of the segments, one or more entity/probability pairs are stored in a cache and associated with the media item for subsequent use in a frequency management described herein, or in one or more other processed requiring advanced detection of entity types on which the model is trained.

Embodiments of the present disclosure provide methods and systems for performing advanced frequency management. A request is received for serving the media item to be displayed on an end-user device or a grouping of devices (e.g., a request for an advertisement in a real-time bidding platform). In response to this request, a frequency management service identifies the media item and performs a lookup against the cache to determine a quantity of times in which the media item was served to the end-user device(s) during a predefined duration of time. The service determines whether to serve the media item by comparing the quantity against one or more frequency management thresholds.

FIG. 1 shows a programmatic advertising system 199 including an advertising platform 101 in accordance with one or more embodiments. As shown in FIG. 1, the advertising platform 101 includes a training module 131, an offline transcoding service 113, an ad exchange 117, a deep learning model service 119, an online media service 121, a frequency management service 111, an online transcoding service 115, an advertising repository 123, a transcoding repository 125, a lookup cache 127, and a training repository 129. The system 199 may also include integration with one or more demand-side platforms (DSPs, e.g., 103), one or more supply-side platforms (SSPs, e.g., 105), one or more advertisers (e.g., 107), and/or one or more publishers (e.g., 109). In one or more embodiments, the system 199 is configured to perform advanced frequency management. The system 199 may be a part of, or coupled with, a platform (e.g., an online advertising platform).

An advertiser 107 can be any entity for which a creative, i.e., an advertisement is produced. The advertiser may interface either directly with the advertising exchange 117 or may distribute their ad content using intermediary services or platforms like the DSP 103, in accordance with various embodiments of the invention. A publisher 109 is the owner of a media space. Examples of publishers are websites, apps, digital out-of-home (DOOH) entities, and etc.

For purposes of this disclosure, an ad impression can refer to a view or engagement that is being bid upon in an advertising exchange (e.g., during a real-time bidding process). An advertisement may also be known as a creative, and may include any format or quantity of media, text, or other data items depending on the medium that is being used.

In one or more embodiments of the invention, the advertising platform 101 is any business and/or technology platform capable of performing advertising monetization. The advertising platform may be configured to perform programmatic advertising processes such as real-time bidding (RTB), and various other advertisement processes. The usage of an advertising platform such as the advertising platform 101 depicted by FIG. 1 is used for exemplary purposes in this disclosure. For clarity of understanding, many of the system components and methods herein are described with regard to exemplary business processes relating to advertising. It should be noted that while these processes may be used effectively in the context of advertising, the specified examples should not be construed as limiting the invention to advertising or other described processes. In fact, many embodiments of the invention described herein, including programmatic generation of training data, model training, media item ingestion, and advanced frequency management, can readily be applied to other platforms, industries, and applications both inside and outside of the realm of advertising.

The systems and methods disclosed in the present disclosure include functionality relating to entity detection, frequency management, and other functionality using various types of media items. For exemplary purposes, many of the foregoing systems and processes are described with video as the media type. It should be noted that the processes of generating training data, model training, entity detection, and frequency management, though often described in the context of video advertisements, can be performed on a variety of different media types and formats, including audio (music/speech/nature/scientific), digital print media (books, magazines, newspapers), television shows, movies, video games, social media posts, and any other content served to one or more audiences for which it may be desirable to perform object/entity detection and/or to limit or control the serving of one or more categories of content based on frequency.

In one or more embodiments of the invention, the advertising exchange 117 is a technology platform including multiple software services executing on different commodity and specialized hardware devices. The components of the advertising exchange 117, in the non-limiting example of FIG. 1, are software services implemented as containerized applications executing in a cloud environment. The model training and model serving components can be implemented using specialized hardware to enable parallelized analysis and performance. Other architectures can be utilized in accordance with the described embodiments.

The demand-side platform (DSP) 103 is a software platform enabling buying of advertising inventory across one or more integrated exchanges. Although a single DSP is depicted in FIG. 1, any number of DSP's or other platforms enabling the purchase of ad inventory can be integrated in accordance with various embodiments. The supply-side platform (SSP) 105 is a software platform enabling publishers to sell advertising inventory across one or more integrated exchanges or services. As with the DSP, any number of SSP's can be integrated with the advertising platform 101 to facilitate the exchange of advertising supply and demand, in accordance with various embodiments.

In one or more embodiments of the invention, the online media service 121, frequency management service 111, online transcoding service 115, training module 131, offline transcoding service 113, deep learning model service 119, and ad exchange 117 are software services or collections of software services configured to communicate both internally and externally of the advertising platform 101, to implement one or more of the functionalities described herein. The systems described in the present disclosure may depict communication and the exchange of information between components using directional and bidirectional lines. Neither is intended to convey exclusive directionality (or lack thereof), and in some cases components are configured to communicate despite having no such depiction in the corresponding figures. Thus, the depiction of these components is intended to be exemplary and non-limiting.

In one embodiment of the invention, the frequency management service 111 is a component of the online media service 121 and the offline transcoding server 113 is a component of the deep learning model service 119. The arrangement of the components and their corresponding architectural design are depicted as being distinct and separate for illustrative purposes only. Many of these components can be implemented within the same binary executable, containerized application, virtual machine, pod, or container orchestration cluster. Performance, cost, and application constraints can dictate modifications to the architecture without compromising function of the depicted systems and processes.

Logo Collection

Figure 1B:
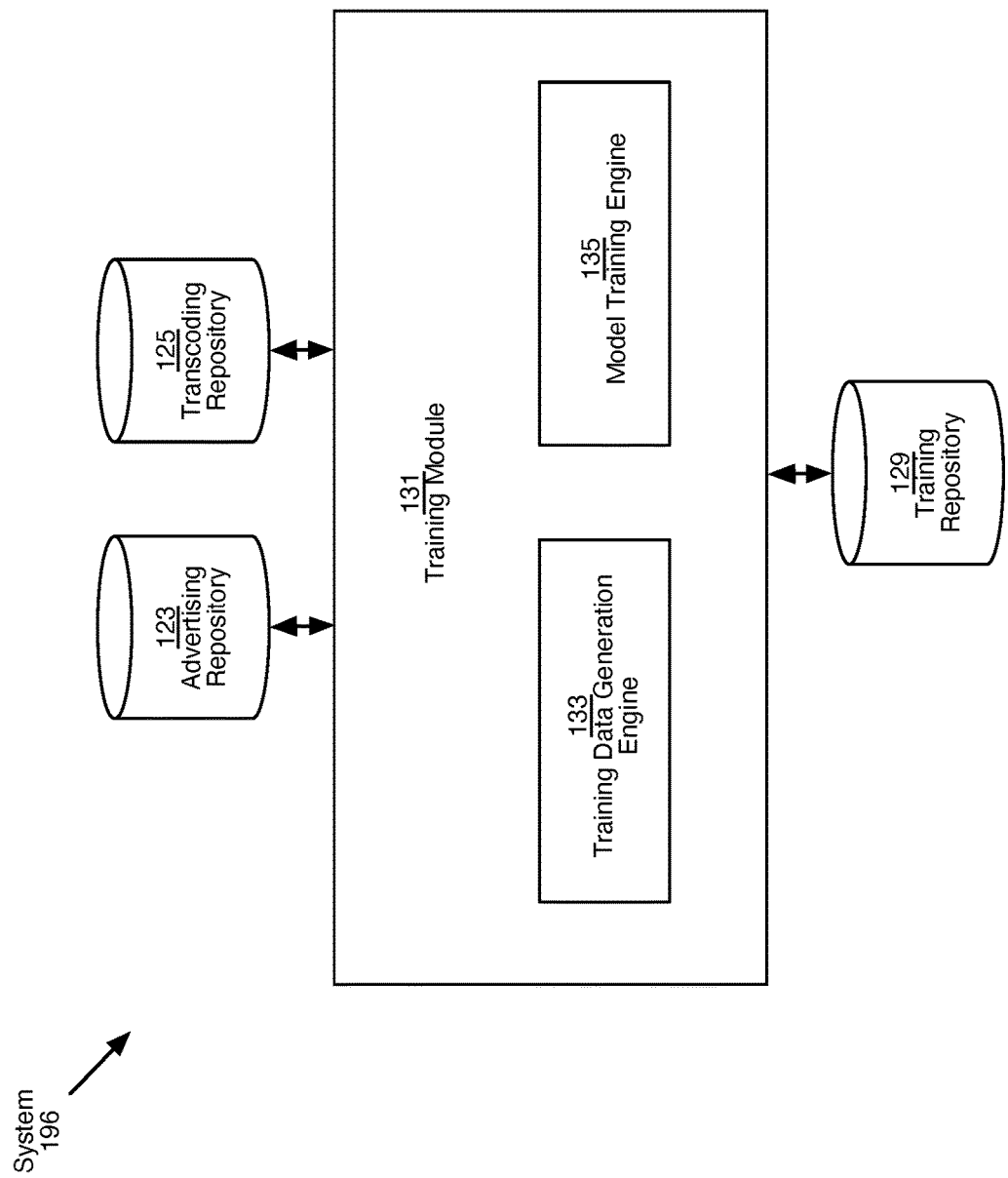
FIG. 1B illustrates a block diagram of a system for training a model to perform advertising entity detection in accordance with one or more embodiments.

FIG. 1B shows a system 196 (optionally a subset of the system 199 of FIG. 1) including the training module 131, the training data generation engine 133, the model training engine 135, the advertising repository 123, the transcoding repository 125, and the training repository 129. In one or more embodiments of the invention, the system 196 is configured to perform programmatic generation of training data and/or generation and training of an artificial intelligence model for entity detection. The system 196 may be a part of, or coupled with, a platform (e.g., the advertising platform 101 of FIG. 1).

In one or more embodiments of the invention, the model training engine 135 includes functionality to generate and train an artificial intelligence model for detecting entities based on a media item. The entity can be a brand, an individual, a topic, a theme, or any other identifiable grouping or type of data, in accordance with various embodiments. The artificial intelligence model can be a convolution neural network (CNN), or other object/entity detection model in accordance with various embodiments.

In one or more embodiments of the invention, the model training engine 135 is configured to execute model training and/or model generation processes on specialized hardware, such as an array of graphics processing units (GPUs) within a server rack or data center. Virtualized compute resources may also be utilized with hardware that is configured for optimal execution of central processing unit (CPU) or memory intensive tasks of each model.

In one or more embodiments of the invention, the training data generation engine 133 includes functionality to identify or obtain a set of assets (e.g., logo images) corresponding to the entity. The assets can be obtained from an external source (e.g., via integration or scraping), manual upload by a human administrator, or from a pre-populated database in the training repository 129, in accordance with various embodiments. The training module 101 can be configured to enable a human to use search engines such as Google, Bing, Duckduckgo, etc. to find images of logos of a brand or entity for purposes of model training. In one embodiment, the training module 101 can be configured to select images similar to a human search or selection.

In one or more embodiments of the invention, the training module 101 includes a user interface enabling an administrator to select/upload assets and training data such as logo images and videos, view model training and serving results, view system logs, and/or to augment training data with human curation/supervision of model training.

For purposes of this disclosure, the asset can be a logo or other image, a video snippet, a piece of text, a trademark, or any other identifiable data item that can be associated with the entity. For example, the entity may be a logo image in transparent GIF, PNG, SVG, rasterized, vector-based, or other format. Other examples of assets can be utilized in different domains. For example, the processes of training data generation, model training, model serving, and frequency management can be used for detecting and controlling the frequency of suggested content types in a social media platform, controlling suggested backgrounds or experiences within a video game, suggesting one or more users in a matching system connecting people online, suggesting work items to be performed by one or more contractors/employees such that variety of tasks reduces likelihood of boredom, and many other applications.

Training Data Generation

In one or more embodiments of the invention, the training data generation engine 133 includes functionality to utilize the assets in generating training data, for purposes of training the model. For example, the training data generation engine 133 may be configured to overlay one or more assets on top of a media item (e.g., a video advertisement) to generate the training data. The resulting training data media item can then be utilized to train the artificial intelligence model.

In one or more embodiments, the advertising repository 123 is configured to store advertising content including media items such as audio/video, links (e.g., uniform resource locators) to one or more media items, and advertising metadata. The advertising repository 123 can further be configured to store publisher content as necessary for performing real-time bidding (RTB), and frequency thresholds and other frequency management data associated with one or more entities, recipients, or content providers.

In one or more embodiments, the training repository 129 is configured to store trained models, training data, assets such as logos, trademarks, media associated with entities such as brands, intermediary data associated with machine learning/artificial intelligence models, and any data associated with training the model(s). Entity related data stored in the training repository 129 can include audio of an entity name or jingle, specific written text such as a brand name, and color palettes associated with an entity. For example, a logo for a brand can be stored in PNG format with transparency to enable overlaying the logo over one or more video frames.

In one or more embodiments, the transcoding repository 125 is configured to store identifiers/fingerprints of one or more media items (e.g., audio/video), URLs to transcoded versions of each media item, and metadata such as a brand/probability array associated with each media item, and any other data associated with transcoding of media content. In various embodiments, the transcoding repository 125 stores the actual media items and/or URLs to media items stored in an external source such as an object storage service. Media items can for the same advertisement can be stored in different resolutions, aspect ratios, formats, or other variations suited for specific applications.

In one or more embodiments of the invention, the training module 131 includes functionality to create a compatible dataset for training the model. Creating a compatible dataset involves ensuring that training data is generated and/or transformed into a format that is usable for training, executing, and evaluating the model.

In one or more embodiments of the invention, the training module 131 includes functionality to download one or more training media items (e.g., training videos) and one or more assets from the training repository 129. A training video is any video used in the generation of training data. The video can be context-specific, brand-specific, or random. For example, a video of a vehicle driving on a road can be used for generating training data for the vehicle industry. The training module 131 can be configured to generate domain specific (e.g., industry specific) training data for the purpose of training specialized models or for tuning/training of general purpose models on specialized data sets. Furthermore, the training module 131 may generate specific types of training data based on metadata associated with the entity. For example, given that the entity is a fast food establishment, the training module 131 can be configured to generate video content of people dining or expressing their intent to eat (e.g., "I am so hungry!"). The training module 131 may be configured to fetch metadata associated with the entity from the advertising repository 123 in order to identify the category of video content that should be utilized. In one embodiment, the training module 131 obtains the video content directly from the entity by providing a user interface for selection, curation, or upload of training media items by a human administrator.

In one or more embodiments of the invention, the training data generation engine 133 includes functionality to obtain one or more assets for generation of training data. The training data generation 133 can obtain these assets (e.g., logo images) from a human administrator by providing a user interface for manual upload, or by programmatically scraping or obtaining them via API. In one embodiment, a collected images are required to meet certain conditions such as: each image should be a 4-channel image in a specified image format, and should be an actual representation of a current logo of the entity for which the detection is intended. For example, in the case of a company, logos may change over time and it may be required that the logo image(s) be current.

In one or more embodiments of the invention, the training module 131 includes functionality to split or label the downloaded media items into multiple distinct sets, such as video or audio sets. Examples of media sets include, but are not limited to, a training set, a test set, and a validation set. In one or more embodiments, the training module 131 guarantees that training and test video frames (images) or audio segments are coming from different media items (different videos or audios).

In one or more embodiments of the invention, the training data generation engine 133 includes functionality to extract a set of frames from each video or a set of segments from each audio to be used for training, testing, and validation. The training data generation engine 133 can be configured to downsample the media item. For purposes of this disclosure, downsampling can refer to any method of selecting a subset of the media item (e.g., frames of the video and/or segments of the audio). The selection can be random or can be performed according to a predefined selection procedure, in accordance with various embodiments of the invention.

In one or more embodiments of the invention, the training data generation engine 133 includes functionality to overlay an asset (e.g., a logo image) on top of a frame and/or to overlay an audio segment on top of an audio. In one embodiment, the training data generation engine 133 can be configured to guarantee that each logo will be overlayed onto the same number of frames (images) within a given training media item. Similarly, the training data generation engine 133 can be configured to ensure that each brand can have the same number of audio segments within a given training media item. In one embodiment, multiple logo images can be overlayed onto the same media item.

In one or more embodiments of the invention, the training data generation engine 133 includes functionality to perform rotation, translation, filtering, and other modifications to the asset in order to prepare the asset to be overlayed onto the media item. For example, the training data generation engine 133 can perform smoothing, sharpening/edge detection, transparency/translucency modification, blurring, light and shadow modification to match a light source, and a variety of other programmatic modifications. The training data generation engine 133 can be configured to perform the modifications to the asset based on analysis of the segment of the media item on which the asset is to be overlayed. For example, the training data generation engine 133 may analyze a video frame and perform a surface detection procedure. Upon detecting the best candidate surface area meeting the minimum size requirements to overlay a logo image, the training data generation engine 133 determines a set of modifications that are necessary in order to properly display the logo image. This includes spatial orientation of the logo image, skewing the image to match the plane of the surface area, performing a color/saturation match of the logo image to the frame, performing smoothing/softening, modification of light/shadow effects to match one or more light sources within the frame, and other programmatic modifications to prepare the logo image to appear natural and unaltered when overlayed on the frame. Similarly, in the case of an audio snippet, various different noise reduction, background hiss/ambient noise matching, frequency normalization, decibel normalization, and other filters can be utilized to match an asset (e.g., a recording of a company's jingle) to the segment of the audio media item being overlayed.

In one or more embodiments of the invention, the training data generation engine 133 includes functionality to select segments of the media item to be overlayed using any number of systems or methods for identifying candidates for legible/comprehensible/life-like or other intended results in the overlayed media item. For example, in the case of an audio media item, the training data generation engine 133 identifies segments of the audio where there is lack of human speech, or overall lack of content/noise (e.g., low-decibel) such that overlaying an audio snippet (e.g., a company's audio jingle) would result in a comprehensible result by the human ear. In another example, in the case of a video advertisement, the training data generation engine 133 selects one or more contiguous sets of frames of the video for image overlay based on image-specific criteria. For example, the training data generation engine 133 may select the set of frames by executing an artificial intelligence model on the video file to detect segments of the video that contain surfaces of sufficient size (e.g., a predefined size) to host the overlayed image. The model may be configured to analyze these surface areas to ensure they are sufficiently perpendicular to the viewing angle of the observer, such that they logo image would not require heavy transformation in order to achieve a realistic result. In another example, the training data generation engine 133 identifies candidate segments of the video based on color matching to the asset image, lack of severe light/shadow distortion of the frame, lack of severe movement or the perception of motion within the video segment, or other predefined criteria for achieving a result that more closely resembles real-world data. The training data generation engine 133 may be configured to select the frames by rating each frame or frame transition on each of a number of criteria (e.g., movement differential, color differential, light/shadow intensity, etc.) and then subsequently identify segments of the video having lower or higher values over a predefined number of contiguous segments. This process may be mathematically optimized using one or more higher order functions identified for the purpose of detecting the segments programmatically. In another example, given that the media item is a video, the data generation engine 133 may select and/or extract a fixed number of frames at specific time intervals or by dividing the frames of the video into sections and selecting 10 contiguous frames per section for analysis.

In one or more embodiments of the invention, the training data generation engine 133 includes functionality to overlay the asset in a manner that results in a natural end-result. In other words, the objective of the system, in one embodiment, is to create training data that is identical to or closely resembling production data. For example, the training data generation engine 133 may "animate" a logo image by slightly modifying the overlayed logo image in each sequential frame in order to give it the appearance of movements. This may be done to match a moving surface area in the source media item in order to create a realistic result.

In one or more embodiments of the invention, the training data generation engine 133 includes functionality to utilize auxiliary asset data in generating training data. Auxiliary asset data can be any data associated with an asset which provides context or further relevance to the entity, domain, industry or other aspect for which the model is intended to be trained. Examples of auxiliary asset data may include, but are not limited to, a color palette of a brand, a set of object types associated with a domain (e.g., vehicle, house, computer), and a photo of a person or group of people associated with the entity/domain (e.g., brand ambassadors, influencers). This data can be used both in the selection or modification of assets during training data generation.

In one or more embodiments of the invention, the training data generation engine 133 includes functionality to include and/or intersperse human generated training data within one or more training data sets of the system. In this way, training data can be compared with both real-world production data, human generated training data, human scored/ranked training data, and other data sets in order to continuously refine and improve the effectiveness of the system, both in terms of entity detection as well as other aspects of the system described herein. For example, a human administrator or worker can log into a user interface of the training module 131 to be shown one or more training data items (e.g., through random selection or some other mechanism). In this example, the user ranks the detection of the model with a thumbs up/down selection to indicate whether the detected entity exists in the source media item. Performance of the system can be tracked, and subsequently the training of the model can be improved by a hybrid approach of programmatic and human curated/administered detection. Human and programmatic detection can also be aggregated or otherwise weighted and incorporated into the entity probability pairs in order to achieve higher recall and lower false positivity.

In one or more embodiments of the invention, the online media service 121 includes functionality to provide one or more training data items to a service provider to be served to actual recipients in order to calculate engagement, reach, and other metrics. For example, in the case of an advertisement training data ("training ad"), the online media service 121 may provide the training ad to the ad exchange 117 to be matched and served to a publisher. The online media service 121 then tracks one or more engagement or other performance metrics of the training ad over a predefined duration of time. This may be performed as a 1% experiment, or some other procedure for serving training data to a small number of recipients in order to measure and compare performance of said data items. The online media service 121 can then calculate a quality score for each of the served training data items based on their performance metric(s) and/or other factors (e.g., human ranking, other scoring relating to the media item itself, etc.). The online media service 121 can exclude or discard training data failing to meet a minimum quality score threshold, or can otherwise reduce the weight of such training data items as inputs to the model training process.

In one or more embodiments of the invention, the training module 131 includes functionality to store the generated training data and/or associated metadata in the training repository (129). This data can then be utilized for purposes of training, evaluating, and/or improving model performance, in accordance with various embodiments of the invention.

Model Training

In one or more embodiments of the invention, the model training engine 135 includes functionality to train a model that generates the highest precision and recall values of the given dataset. In addition to that, the model training engine 135 may be configured to perform a process of parameter selection and tuning in order to fit our predictions to the ground truth (bounding boxes, in the case of image data) defined in our training data set.

The generated model can be, for example, a Convolution Neural Network (CNN) with many convolution layers, each comprising a set of weights. In one embodiment of the invention, these weights are referred to as "parameters" of the model. In this example, each weight is a value corresponding to a vector that can be adjusted to tune the model. The model training engine 135 includes functionality to modify these parameter values using various mathematical operations and processes such as gradient descent in order to maximize the fit of prediction data to the ground truth. The model training engine 135 can be configured to programmatically perform the process of parameter selection, optionally with human oversight and/or inputs. In the example of video content, the model training engine 135 can be configured to perform parameter tuning in order to fit predicted bounding boxes of detected entities to provided bounding boxes of actual entities in the video training data. In the example of audio content, the model training engine 135 can be configured to perform parameter tuning in order to fit predicted audio segments of detected entities to provided audio segments of actual entities in the audio training data.

Given the nature of the problem and the advancement of deep learning-based models for computer vision, deep learning-based models may be used to achieve high precision and recall. In one embodiment of the invention, a Convolution Neural Network (CNN) based model is generated by the model training engine 135 to train in entity detection (i.e. Yolo). The model takes as input a segment of a media item (e.g., an image frame of a video) with an overlaid asset (e.g., a logo image) and the location of the asset in that segment. The training data may include hundreds of thousands of images (or more), and the process of training the model with general purpose compute resources can be significant. To overcome this problem, in one embodiment of the invention, multi-GPU training has been utilized to reduce the training time (e.g., from days to few hours).

In one or more embodiments of the invention, the model training engine 135 uses a supervised based learning algorithm. In one example, an observation and its target value must be presented for the algorithms to work. Furthermore, in this example, the presented pipeline uses a deep learning model which requires a huge amount of data. To build such a dataset, the training module 131 may be configured to optionally utilize human intelligence via human assisted labeling and curation. For example, the training module 131 may include an interface enabling a human to view an asset such as an image of a dog, and to label the breed or other characteristic of the dog.

In one or more embodiments of the invention, the model training engine 135 includes functionality to evaluate candidate models according to one or more criteria. For example, the model training engine 135 can be configured to calculate or obtain metric values representing the performance of each model. Examples of metric values include, but are not limited to, an overall confidence score and voting value of the model. These criteria can include any objective measure of model performance, accuracy, precision, and/or quality, in accordance with various embodiments.

In one or more embodiments of the invention, the model training engine 135 includes functionality to select the best model from the candidate model given evaluation results. This can include, but is not limited to, selecting the highest metric value(s) from a list of candidate models, selecting all candidate models having a particular metric value or aggregation of metric values exceeding a predefined threshold (as defined in the training repository 129), and/or any other method of ranking and evaluating the models.

Model Deployment

In one or more embodiments of the invention, the model training engine 135 includes functionality to prepare the selected model for deployment (i.e. remove unnecessary computation steps), assign the model as a release model, and deploy the model. Deploying the model can involve utilizing a container orchestration system such as Docker/Kubernetes to, for example, create a docker container for deployment.

In one example, in order to handy: processing hundreds of thousands of advertisement videos, the model training engine 135 is implemented as a framework using Kubernetes technology (Teldon). The developed framework is able to take the developed detection model, create a docker container, run pods, and start serving the del. In addition to that, the developed frame k is able to scale up or down depending on the quantity of traffic.

Ad Ingestion

Figure 1C:
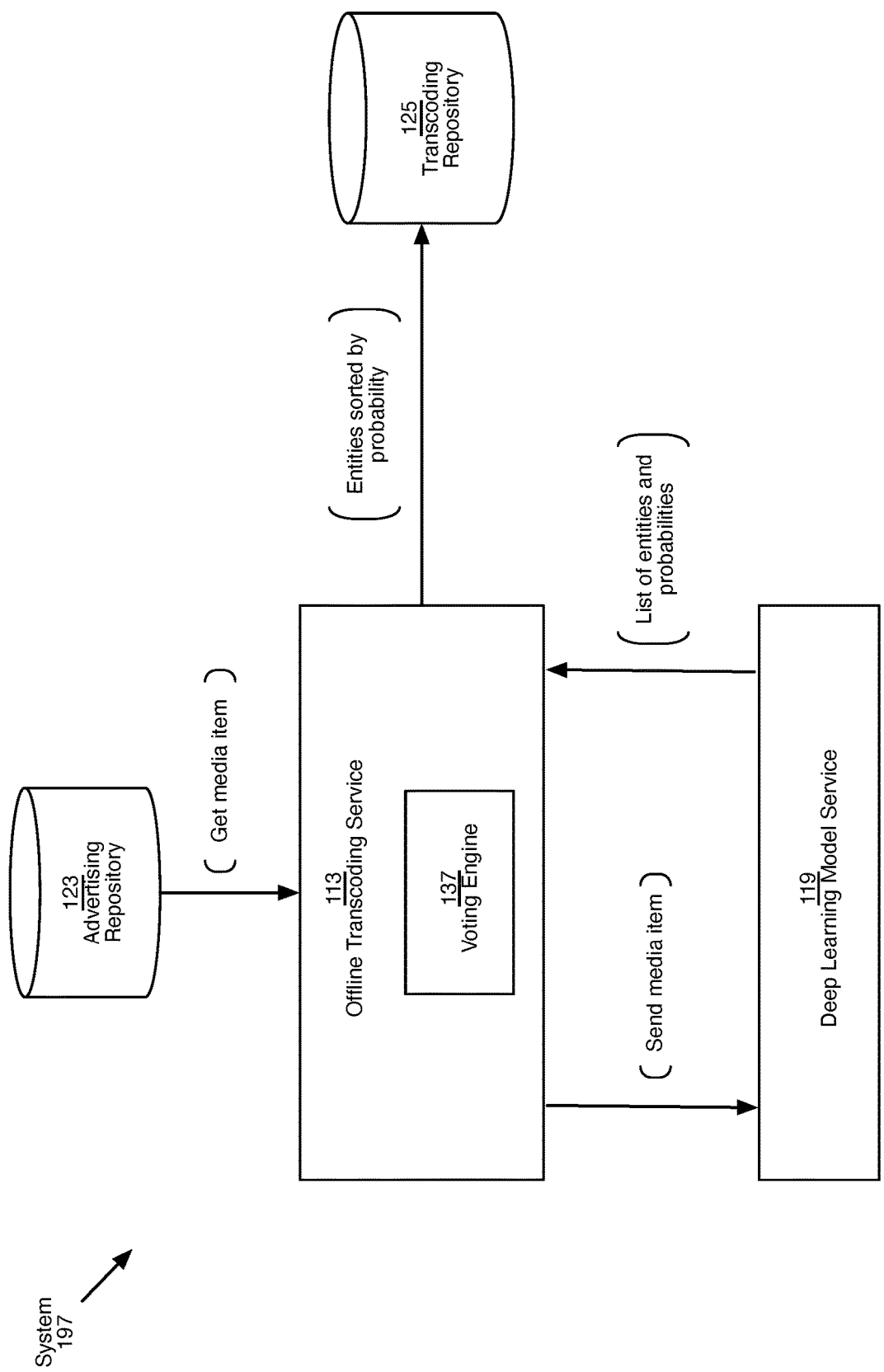
FIG. 1C illustrates a block diagram of a system for media transcoding and deep learning model serving in accordance with one or more embodiments.

FIG. 1C shows a system 197 (optionally a subset of the system 199 of FIG. 1) including the offline transcoding service 113, the deep learning model service 119, the voting engine 137, the advertising repository 123, and the transcoding repository 125. In one or more embodiments of the invention, the system 197 is configured to perform execution of an artificial intelligence model for entity detection in media files. The system 197 may be a part of, or coupled with, a platform (e.g., the advertising platform 101 of FIG. 1).

In one or more embodiments of the invention, the offline transcoding service 113 includes functionality to ingest a new media item and to transcode or otherwise analyze the media item in preparation for frequency management. Transcoding can include, but is not limited to, converting the source media item into multiple different file formats or resolutions (for ingestion by different clients), removing personal or private information from the source media item, modifying the file size or duration of the source media item, and normalizing audio/video/image content within the source media item. The transcoding of the media item may be performed concurrently or prior to analysis by the deep learning service 119. In one embodiment of the invention, the offline transcoding service 113 performs transcoding of the media item to generate a modified media item in preparation for model analysis.

For example, the offline transcoding server 113 includes functionality to identify an advertisement. The advertisement may be obtained from a queue (e.g., a first-in-first-out queue) of firstly viewed advertisements, or may be obtained via an inbound notification system for processing advertisement media content.

In one or more embodiments of the invention, media items can be obtained from an advertiser 107, DSP 103, a direct buy campaign, an advertising aggregator, a network or integration partner, or any other source. This can include real-time bidding (RTB) requests to an ad exchange 117, requests for ad delivery in the response loop, or an offline process searching content in a historical data repository of ad content. In the case of an advertisement request or a match from an RTB system, an advertisement that is new and not yet ingested may not be served, but rather queued for ingestion by the offline transcoding server 113. In this way, these firstly seen advertisement media items are queued for offline analysis, outside of the client-initiated response loop.

Model Serving

In one or more embodiments of the invention, the offline transcoding service 113 sends an analysis request to the deep learning model service 119. The request includes an identifier of the media item, or optionally can include the media item itself. The deep learning model service 119 includes functionality to obtain a media item and to perform analysis of the media item by an artificial intelligence model in response to the analysis request. The deep learning model service 119 may execute the model generated by the model training engine 135 against the media item in order to detect one or more entity/probability pairs. Each entity represents a thing, type, category, brand, or grouping of things which will be limited or throttled by advanced frequency management systems and processes disclosed herein, in accordance with various embodiments of the invention. In one embodiment, the probability represents a likelihood that the media item contains the associated entity. In another embodiment, the probability is simply a value representing a strength of association between the entity and the media item. Upon completion of the model analysis, the deep learning model service 119 returns the identified entity/probability pairs to the offline transcoding service in response to the analysis request.

In one or more embodiments of the invention, the offline transcoding service 113 includes functionality to receive the entity/probability pairs from the deep learning model service 119 in response to the analysis request. The offline transcoding service 113 then stores the entities, optionally sorted by their probabilities, along with an identifier of the media item inside the transcoding repository 125. In one embodiment of the invention, the offline transcoding engine 113 calculates or identifies a final entity/probability pair based on the set of pairs returned by the deep learning model service 119 and store only the final pair in the transcoding repository 125. For example, the offline transcoding engine 113 (or voting engine 137) may identify the most frequent entity in the set of pairs and calculate a final probability for that entity as an average of all the probabilities corresponding to that entity.

In one or more embodiments of the invention, the offline transcoding service 113 includes functionality to instantiate an entry in the transcoding repository 125 corresponding to the identified entity. This initial entry in the transcoding repository 125 simply indicates that the media item has been ingested. Additionally, an entry or multiple entries (one for each recipient) are created in the lookup cache 127 and continuously updated to track impressions of the media item for multiple recipients.

The lookup cache 127 and the transcoding repository 125 are specialized data stores configured to store entity/probability pairs. These data stores may be designed to meet the demands of a high-throughput, low-latency, and high availability system. To meet these requirements, an in-memory data structure such as an inverted index or other map structure may be used. Simpler alternatives such as an in-memory key-value store (e.g., Redis) may suffice in certain applications. Specialized virtualized or physical hardware may also be utilized to meet the aforementioned requirements.

In one or more embodiments of the invention, an identifier of the media item is used as a key value for identifying the media item in the transcoding repository 125. Alternatively, in one or more embodiments, any combination of multiple values, either generated or obtained, may be used collectively to identify the media item. Further information regarding the identification of media items is provided in the following description of the online transcoding service 115 of FIG. 1D.

Voting to Reduce False Positivity

Returning to FIG. 1C, in one or more embodiments of the invention, the voting engine 137 includes functionality to perform a process of voting to reduce false positivity in the entity detection performed by the deep learning model service 119. This process can involve the usage of hyperparameter values (e.g., threshold score and count values), which have been optimized for the given model in a process known as hyperparameter tuning. The voting process involves obtaining the set of candidate entity/probability pairs and performing an analysis to identify specific candidate pairs that should be pruned. The process of identifying false positives or potential false positives for pruning may involve any number of heuristics, trained artificial intelligence models, algorithms, and/or specific filter/detection criteria. Similar or the same criteria may be used regardless of the type of the media item (e.g., audio, video), though specific criteria or detection models can be utilized for determining false positivity in various embodiments. Thus, the voting engine 137 includes functionality to apply voting on all of the candidate entity/probability pairs to improve the accuracy of the model while maintaining the recall value.

In one or more embodiments of the invention, the voting engine 137 includes functionality to obtain a set of candidate entity/probability pairs detected in the media item by the deep learning model service 119. In the case where multiple different entities are detected, the voting engine 137 is configured to potentially prune one or more of the entity/probability pairs from a final result set which is stored by the offline transcoding engine 113 in the transcoding repository 125.

The voting engine 137 can be implemented with various different voting procedures, some of which are illustrated herein by way of example. In a first example, the voting process initially analyzes all of the candidate entity/probability pairs to identify aggregate data and insights. Subsequently, the voting engine 137 analyzes each candidate entity/probability pair to determine a degree of deviation from the aggregate data. If the degree of deviation exceeds a predefined threshold (a hyperparameter value) for a particular media item, the voting engine 137 prunes that media item by excluding it from the final result set. For purposes of this example, the aggregate data may be a determination that a majority or plurality of the entities correspond to a particular industry, category, or other grouping (e.g., auto manufacturers). Based on this determination, the voting engine 137 determines whether or not each candidate pair corresponds to the identified grouping, and if not (degree of deviation being 100%), the voting engine 137 excludes the pair from the final result set. In one embodiment, the voting engine 137 is configured to identify common characteristics among sets of the entity/probability pairs, and to prune one or more pairs that do not contain the characteristic(s). The voting algorithm can be utilized during the process of model generation and evaluation using validation data sets (depicted by elements of FIG. 5) to select the appropriate hyperparameter values corresponding to each model. Thus, during the model serving process, the hyperparameter values are known.

In one or more embodiments of the invention, the voting engine 137 includes functionality to exclude candidate entity/probability pairs based on one or more predefined hyperparameter values. A hyperparameter value can be any quantitative limit used to prune candidate pairs. Examples of a hyperparameter value can include, but are not limited to, a minimum probability score corresponding to the model, a maximum number of entities per media item (e.g., whereby the highest probability candidate pairs are retained and the rest are pruned), an average probability of all the candidate pairs (whereby below average probability pairs are pruned), a minimum probability threshold associated with one or more entities (e.g., a brand-specific threshold), and any other quantifiable heuristic for pruning candidate entity/probability pairs.

In another example of the voting procedure, the voting engine 137 obtains ten entity/probability pairs corresponding to a media item. The voting engine 137 determines that nine of the pairs correspond to the same entity (vehicle manufacturer A), while the tenth pair corresponds to a different entity (vehicle manufacturer B). The voting engine 137 identifies a voting threshold hyperparameter value designating that any entity present in less than 25% of the detected pairs shall be pruned. Based on this voting threshold, the voting engine 137 prunes the tenth entity/probability pair and returns a result set including the remaining nine pairs for storage within the in the transcoding repository 125.

In one or more embodiments of the invention, unlike the example depicted by FIG. 1C (or in addition thereto), the voting engine 137 is a component of training module 131. In this way, the voting engine 137 may be configured to perform a process of voting to reduce false positivity in the logo detection performed by a model during the process of generating and evaluating candidate models.

Frequency Management

FIG. 1D shows a system 198 (optionally a subset of the system 199 of FIG. 1) including the online media service 121, the frequency management service 111, the online transcoding service 115, the advertising repository 123, the transcoding repository 125, and the lookup cache 127. In one or more embodiments of the invention, the system 197 is configured to perform advanced frequency management within the response loop of an online request (for which a client application is awaiting a reply in real-time). The system 198 may be a part of, or coupled with, a platform (e.g., the advertising platform 101 of FIG. 1).

In one or more embodiments of the invention, the online media service 121 is a service that is configured to receive publisher requests for advertising content and to match those requests to digital advertising content. In this exemplary representation, the online media service 121 is configured to communicate with the ad exchange 117 in order to obtain candidate advertisement media items and to perform frequency management upon those candidate items in order to determine whether or not they should be served to the publisher. The ad exchange 117 is configured to perform real-time bidding (RTB) and matching functionality to select candidate advertisements for each publisher request. As mentioned above, media items can be obtained from an advertiser 107, DSP 103, a direct buy campaign, an advertising aggregator, a network or integration partner, or any other source.

It should be noted that the terms advertisement media item and advertisement are sometimes used interchangeably in the present disclosure. Depending on the application, the media item and the advertisement may be identical, or in certain cases the advertisement may contain one or more media items. In applications where the advertisement contains or is related to one or more media items, the systems and processes described herein can be modified to track the item upon which entity detection and/or frequency management is intended to be performed, and to keep relations to the advertisement as necessary. Neither should be construed as limiting the scope or applicability of the embodiments disclosed herein.

It should further be noted that although multiple figures, systems, processes, and examples in the present disclosure relate to advertising content and associated services (e.g., the online media service 121), the embodiments of the invention should not be construed as being limited to advertising applications. The training data generation, model serving, frequency management, and other embodiments of the invention in the present disclosure can be applied to any application that requires serving content to one or more recipients. The entity type, data types/formats, industry, and/or recipient type are not necessarily limiting with respect to the function or application of the described embodiments.

In one or more embodiments of the invention, the frequency management service 111 includes functionality to control the frequency with which media items of a particular type and/or advertisements associated with a particular brand or context are served to a particular client and/or collection of clients. The frequency management service 111 is configured to fetch frequency management data associated with one or more clients or client types. A client can be designated by a client identifier (e.g., a universal advertising identifier), an Internet Protocol (IP) address, or any combination of identifying attributes, preferably unique or semi-unique according to the desired granularity of frequency targeting. The frequency management service 111 may be configured to identify the frequency management target(s) by region, household, or individual user, depending on the selected identifying attributes(s).

The frequency management service 111 can perform frequency management to control the frequency of a particular subset or grouping of media items (e.g., ads) to the one or more clients, with varying levels of granularity. Examples of grouping of media items include, but are not limited to, advertisements associated with a brand, media items corresponding to a particular industry, media items of a particular visual or auditory grouping (by color palette, volume, "pace", i.e., frequency of movement or variation, etc.), ads corresponding to a user preference category (e.g., anime, action/adventure, fantasy, non-fiction), music/songs of a particular genre, podcasts of a particular category, and/or any grouping of media items for which an artificial intelligence model can be trained.

In one or more embodiments of the invention, the frequency management service 111 includes functionality to receive a request to determine if a media item should be served. The request may originate from the online media service 121 or any other service requesting frequency management, in accordance with various embodiments. Based on the request, the frequency management service 111 performs a query against the lookup cache 127.

In one or more embodiments of the invention, the lookup cache 127 is a repository configured to store frequency statistics corresponding to one or more clients or groupings of clients (e.g., an advertising publisher). Specifically, the lookup cache 127 can be configured to store, for each identifier of the client(s), an entity identifier corresponding to the media item and a cumulative count depicting the number of times that media item has been served to the client(s). In this way, the lookup cache 127 tracks a number of times that each media item or grouping of media items has been served to one or more recipients and enables the frequency management service 111 to use any number of thresholds to modulate the service of said media items according to any number of predefined rules.

The lookup cache 127 can be configured to perform queries based on multiple inputs and filter criteria. For example, the lookup cache 127 can obtain a query request including an entity identifier, a recipient identifier, and an optional time parameter indicating the duration for which frequency management statistics should be obtained. In response to the request, the lookup cache 127 performs a search and returns statistics including a count depicting the number of times that media item has been served (e.g., a number of impressions) to the recipient during the provided duration.

In one embodiment of the invention, the lookup cache 127 is implemented as an in-memory repository such as Redis or Memcached. This, coupled with the key-value architecture of these stores enables the frequency management service 111 to query for frequency statistics within the response loop of an API request. Sharding can be implemented to enable horizontal scaling of the lookup cache 127, while maintaining low latency and increasing throughput. The architecture described herein is by way of example only—any other technology for storing and retrieval of the data can be used according to the constraints of the system at hand.

In one or more embodiments of the invention, the frequency management service 111 includes functionality to obtain frequency management data from the advertising repository 123. The frequency management data includes one or more frequency thresholds, each corresponding to a duration of time. For example, one frequency threshold can be 1 impression per day. Another example is two impressions per hour. In this way, the frequency threshold defines a limit to the number of times a media item can be delivered during the given trailing duration of time. In other embodiments of the invention, the frequency duration corresponds to a given time range instead of a trailing duration of time. For example, a frequency threshold can be two impressions between August 1 and August 2 of the year 2021. Any mechanism to defining a limit to a quantity or rate of serving media items may be used, in accordance with various embodiments of the invention.

In one or more embodiments of the invention, the frequency threshold is associated with a recipient such as a client device or grouping of client devices identified by a recipient identifier. Examples of a recipient identifier can include, but are not limited to, a universal device identifier (UDID), an identifier for advertisers (IDFA), a media access control (MAC) address, an Internet Protocol (IP) address, an International Mobile Equipment Identity (IMEI), a subnet identifier (partial IP), a household identifier, an OpenID identifier, and a user identifier of a platform.

In one or more embodiments of the invention, the frequency management service 111 includes functionality to request entity/probability information from the online transcoding service 115, for a given media item. In one embodiment of the invention, the frequency management service 111 receives a request to perform frequency management for a given media item and initially makes the request to the online transcoding service 115 for entity/probability information regarding the media item. Upon receiving the entity/probability information (and/or a confirmation that the media item is ingested), the frequency management service 111 queries the lookup cache 127 with an entity identifier of the media item (also received from the online transcoding service 115). Alternatively, the online transcoding service 115 may respond with an indication that the media item has not yet been ingested and the frequency management service 111 responds by queueing the media item for ingestion by one or more offline processes (e.g., executed by the offline transcoding service 113).

In one or more embodiments of the invention, the online transcoding service 115 includes functionality to match a media item to an entity identifier based on inference. Inference can involve matching one or more similar or identical media items based on a heuristic algorithm or analysis involving one or more matching criteria. The output of the inference is an identifier of the media item. In a simple example, the identifier is an advertisement identifier which is then mapped to the brand/probability information in the transcoding repository. Various different types of inference can be performed ranging from identifying the aforementioned advertisement identifier to complex derivation or construction of an identifier based on various inputs, in accordance with various embodiments. The online transcoding service 115 performs inference upon media items, obtains an identifier of the media item, and obtains entity/probability information corresponding to the media item. The online transcoding service 115 provides the entity/probability information to the frequency management service 111 in response to a request (e.g., an API or remote procedure call).

In one or more embodiments of the invention, the transcoding repository 125 is configured to store the identifiers of media items that have already been ingested, transcoded, and/or analyzed. Each identifier can be mapped to one or more entity/probability pairs and/or other entity information associated with the media item (e.g., entity name, website, address, etc.). Thus, the online transcoding service 115 is configured to query the transcoding repository 125 with an identifier of a media item in order to determine if the media item has been "seen" by the system (i.e., ingested/transcoded) or not. In one or more embodiments, if it is determined that the media item has not yet been ingested, the frequency management service 111 or the online transcoding service 115 queues the ad for offline ingestion. The frequency management service 111 may then respond with an indication that the ad should not be served until ingestion is complete, or may alternatively increment the impression count for the media items in the lookup cache 127 and serve the ad, then correlate the impression to an entity (e.g., a brand) upon completion of the ingestion/transcoding process.

In a simple example, the online transcoding service 115 uses a uniform resource locator (URL) of the media item as a unique identifier for purposes of identifying the media item throughout the processes described herein (e.g., determining if the media item). In another example, the online transcoding service 115 is configured to calculate a hash value of the media item, and then use the hash value as the identifier for purposes of querying the transcoding repository 125. In this way, it can be quickly and efficiently be determined if the media item has previously been ingested and analyzed. In another embodiment, the online transcoding service 115 calculates the identifier by identifying one or more key frames within a video and then calculating an aggregate hash value of the key frame(s). In this context, it should be noted that the concept of a key frame is different from that of key frames used in the description of video compression algorithms. In one example, key frames are semi-deterministically identified by detecting one or more boundary conditions of the media item. In the case of a video, examples of key frames can include, but are not limited to, the frame constituting the greatest contrast value, the frame for which the greatest/least motion value is detected between frames, and the frame corresponding to the highest/lowest decibel or frequency of audio.

In one or more embodiments of the invention, the online transcoding service 115 includes functionality to use the identifier of the media item to query the transcoding repository 125 for entity/probability information associated with the media item. Based on the response from the transcoding repository 125, the online transcoding service 125 determines whether or not the media item has been ingested, and if ingested, receives entity/probability information associated with the media item. The online transcoding service 115 responds to the frequency management service 111 with the entity/probability pair(s) or an indication that the data item is not yet ingested and should therefore not be served.

In one or more embodiments of the invention, the frequency management service 111 includes functionality to select an entity based on the entity/probability pairs identified for the media item. The frequency management service 111 may utilize a global threshold or a threshold mapped to the specific brand in order to select the entity. For example, the highest probability entity may be selected, or any number of entities exceeding the entity threshold may be selected.

In one or more embodiments of the invention, the frequency management service 111 includes functionality to use an identifier of the selected entity (along with the recipient identifier) to query the lookup cache 127 for frequency statistics. For example, the identifier of the entity may be a brand identifier of an advertiser such as a company, or in a broader application, an identifier of an industry or industry segment such as "electric vehicle manufacturers." In this way, frequency management techniques can be applied to multiple different groupings of content types (even concurrently), in order to control and specifically target the volume of various content types delivered to recipients over time. Similarly, recipient identifiers can have varying levels of granularity, ranging, for example, from an individual client device identifier to a network identifier of an entire geographic region/state/country. Many different combinations of these groupings can be utilized to achieve various intended targets, in accordance with various embodiments of the invention.

The frequency management service 111 can then compare the frequency statistics fetched from the lookup cache 127 with one or more frequency thresholds to determine if the media item should be served or not. In one example, the frequency statistics for a brand indicates that a particular publisher has been served media items related to the brand two times within the past 24 hours. The frequency management service 111 obtains a frequency threshold for the brand, indicating that a maximum of three requests may be served to any publisher within any trailing 24 hour period. The frequency management service 111 then determines that the media item may be served, based on the threshold not being met. The frequency management service 111 responds to the online media service 121 with a response indicating that the media item may be served and also performs an update to the lookup cache to increment the frequency statistics for the publisher to indicate that the publisher has now been served media items related to the brand three times within the past 24 hours.

In one or more embodiments of the invention, the frequency management service 111 includes functionality to update frequency statistics in the lookup cache 127. The update can be executed at any number of discrete times, including but not limited to, upon returning an instruction to proceed with serving the media item, upon receiving confirmation that the media item has been served by the online media service 121, upon determining that a frequency threshold has not been met, or at any other point in time. Incrementing the frequency statistics can be done by an online process or by an offline process, in accordance with various embodiments. In an asynchronous system, the lookup cache 127 may be eventually consistent, and may potentially and occasionally exceed a given frequency threshold due to timing constraints of the system.

Flowcharts

Figure 2:
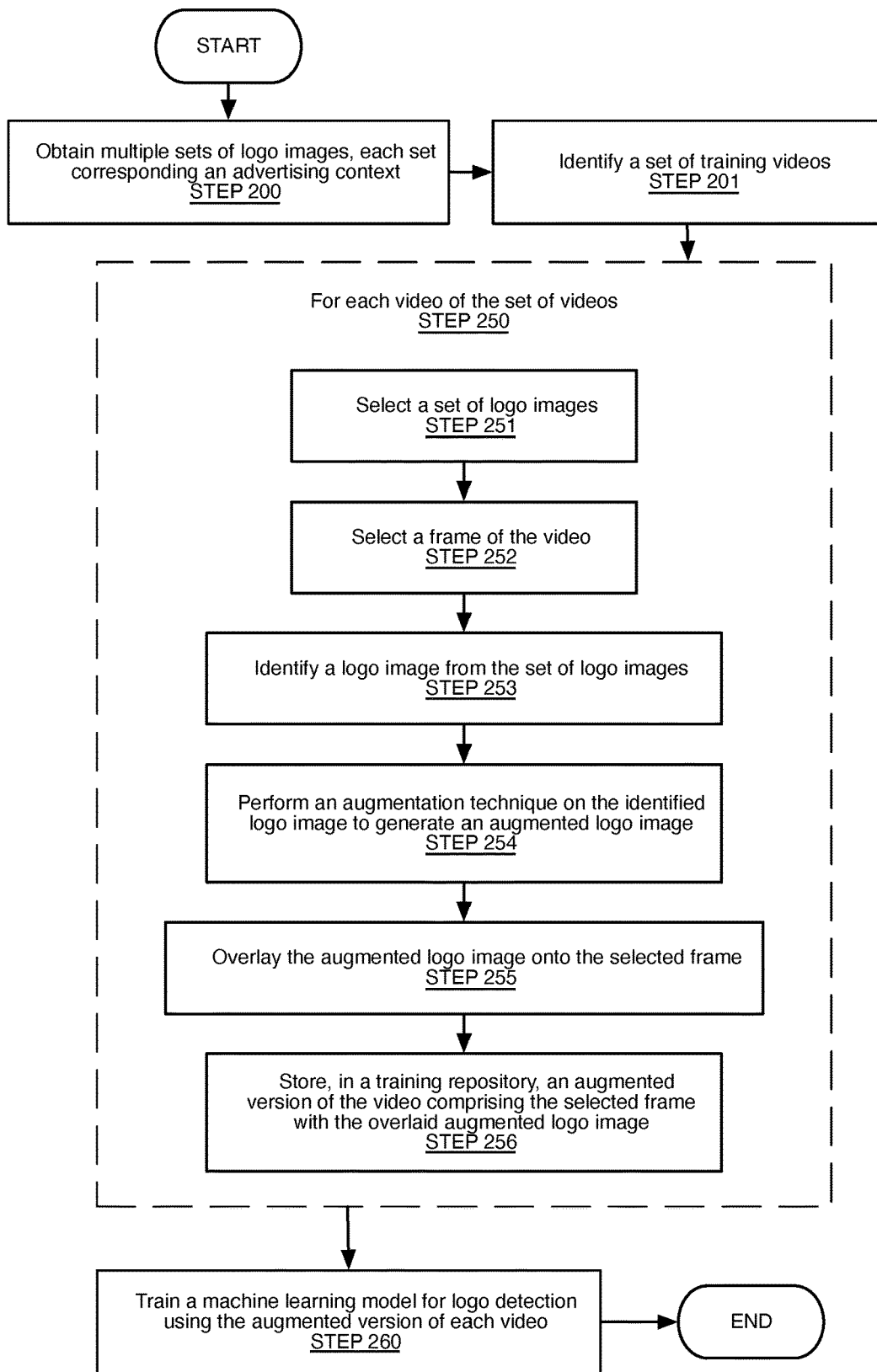
FIGS. 2-6 illustrate flowcharts in accordance with one or more embodiments.

FIG. 2 shows a flowchart of a method for generation of training data for use in advanced frequency management techniques. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 2 should not be construed as limiting the scope of the invention.

In STEP 200, multiple sets of logo images are obtained. Each set of logo images corresponds to an advertising context, in accordance with various embodiments of the invention. The advertising context can be any entity, brand, or category, type, or grouping of content, in accordance with various embodiments.

In STEP 201, a set of training videos is identified. One or more training videos can be obtained from an external source associated with the advertising context (e.g., a website or server of a company whose brand or logo is being used in STEP 200), manually uploaded by an administrator/user, scraped from one or more websites, downloaded from one or more stock video providers, and/or any other source of data. In one embodiment, the training data is downloaded from one or more competitors of the brand/company.

In STEP 250, each video is analyzed serially or in parallel. In or more embodiments of the invention, the video is pre-analyzed (e.g., by the training data generation engine 133 of FIG. 1B, above), in order to determine a set of characteristics of the video and/or to select one or more frames of the video for analysis in STEP 252. The frames may be selected based on a likelihood of containing a viewable logo image, for example, by selecting frames from a set of the slowest moving segments of the video. In this example, it may be required to select consecutive frames or batches of frames with a minimum distance (number of frames or duration of time) between one another. In one embodiment, the frames are selected based on color variation relative to the logo image(s). For example, the training data generation engine 133 of FIG. 1B may be configured to select frames with sufficiently different color differential to that of the logo, so that the logo is more visible to the human eye when overlayed onto the frame. In another embodiment, the selected frame has a color differential with the logo image (or average of a set of logo images) that is within a predefined range.

A set of the logo images corresponding to the video is selected in STEP 251. There may or may not be a relationship between the set of logo images and the video being analyzed. For example, the video may correspond to an industry, category, brand, or other association with the set of logo images.

In STEP 251, one logo image is selected from the set of logo images. This may be a random selection, or in the case of the logo images being an ordered list, the selected logo may be first in the sequence of logo images. the set of ordered images is ordered according to a light to dark or color based progression of the video. In one example, the training data generation engine 133 of FIG. 1B is configured to order the set of logo images according to a pre-selected set of frames of the video. The selection of the logo image and frames can occur in any order, in accordance with various embodiments of the invention.

In STEP 252, a frame of the video is selected. The video frame may be selected based on one or more characteristics of the logo image(s) (of STEP 251), and/or may be determined using any number of selection criteria. For example, the video frames may be selected to increase contract between the selected logo image(s), and may have a minimum distance/duration between consecutive frames. Any variation of selection criterion can be used to mimic actual advertising videos and/or training data that more closely resembles real world content.

In STEP 253, a logo image is identified from the set of logo images. The process may be performed with a single logo image per iteration of STEP 250, or with a set of related logo images (e.g., multiple different logo images per brand). Thus, in one embodiment, STEP 251 is obviated.

In STEP 254, an augmentation technique is performed on the identified logo image to generate an augmented logo image. The augmentation technique can involve any method of modifying the logo image of STEP 251 in preparation for incorporating the logo image into the selected video frame of STEP 252. The augmentation technique may involve any number of transformations to the logo image. For example, partial transparency may be applied to the logo image, contrast matching, color filtering based on a pre-defined palette or a detected color of the frame (or a portion thereof), rotation/translation to match a surface depicted within the frame, shadow and lighting effects to match a light source depicted within the frame, and any number of other augmentations may be performed in accordance with various embodiments.

In STEP 255, the augmented logo image is overlayed onto the selected frame in order to create an augmented frame. In one embodiment, another augmentation technique is performed after overlaying the logo image. This post-overlay augmentation technique is performed on the entire frame (not just the logo image) and can involve one or more filters or processes for creating a life-like image from one or more overlayed images. For example, this augmentation technique can be configured to smooth edges and to blend the images into a lifelike composite.

In STEP 256, upon processing all frames in the selected video (of STEP 250), the augmented frames are merged back into the original video to create an augmented version of the video. Other post-merge processing techniques can be applied to the video in order to ensure realistic output, smooth transitions, and close resemblance to the type of content which the model is being trained for. This final augmented video is tagged as a training media item and stored in a training repository.

In STEP 260, a machine learning model is trained for logo detection using the augmented version of each video. For example, model training can involve usage of a Convolution Neural Network (CNN) using the "You Only Look Once" (YOLO) object detection algorithm. Other artificial intelligence models and techniques can be used in accordance with various embodiments of the invention. Furthermore, the set of videos in STEP 201 can be any grouping of video content for a particular logo type, industry, or even media type (audio, voice, music, etc.). This model can then be deployed for usage in logo detection processes such as the process of FIG. 3, described below.

In order to maintain the continuity of the video, consecutive batches of frames may be selected for analysis in the process of FIG. 2, with each batch being a minimum distance (in duration or number of frames) from the next batch. In one or more embodiments, the same logo image is overlayed onto each batch of frames (STEP 255), with optionally different augmentations performed on each frame in the batch of frames (STEP 254). In this way, a logo image can be made to appear as though it is physically present in the original recording.

Figure 3:
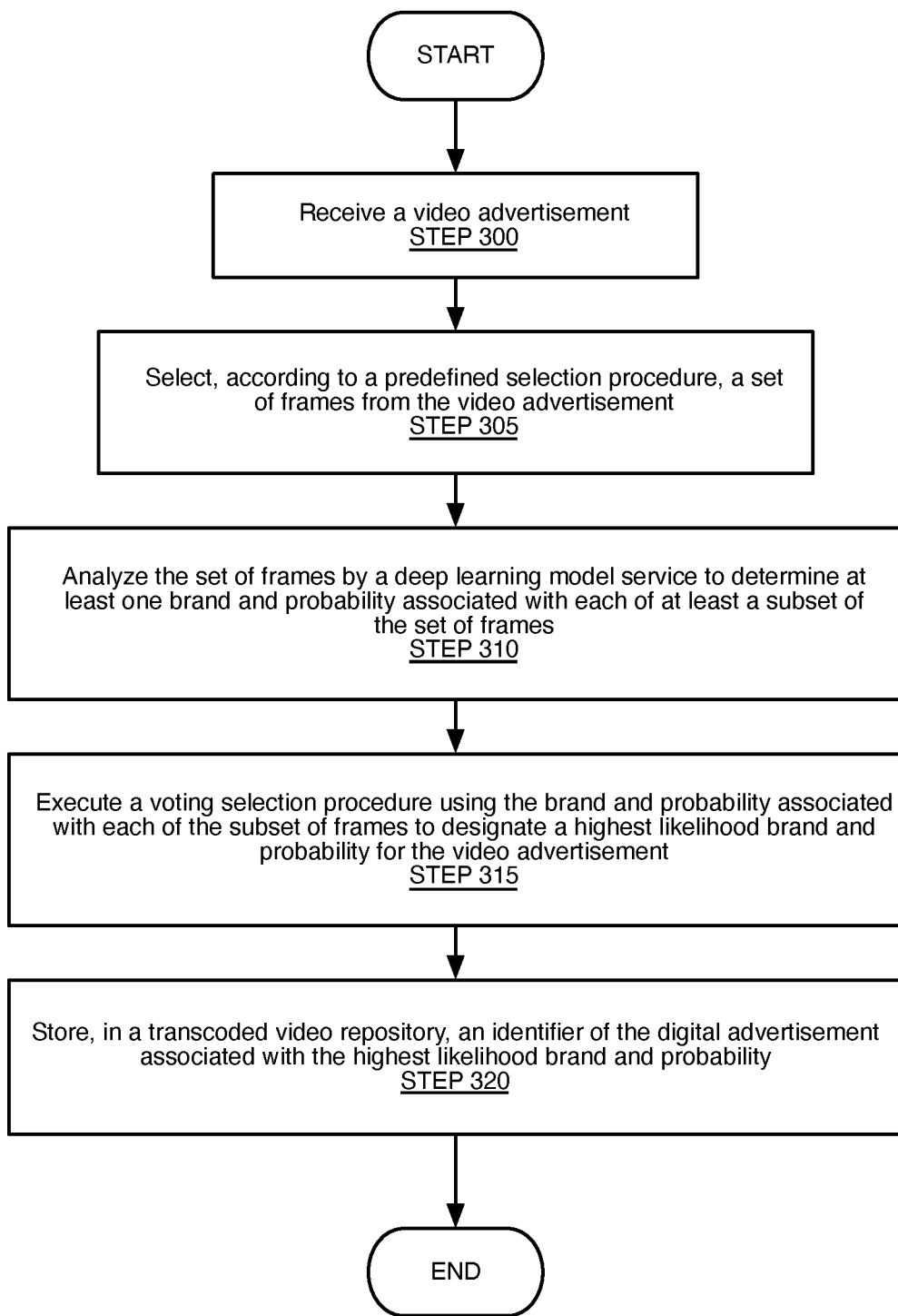

FIG. 3 shows a flowchart of a method for ingestion of a new advertisement and transcoding of ad content for use in advanced frequency management techniques. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 3 should not be construed as limiting the scope of the invention.

In STEP 300, a video advertisement is received. The video can be queued for transcoding and analysis by an artificial intelligence model configured to determine one or more entities (e.g., a brand) associated with the video. The video can be obtained by an offline service comprising worker threads that are configured to process items from a queueing service. In this example, each item from the queue includes a link to a video media item of an advertisement. The video can then be downloaded from a repository (e.g., advertising repository 123 of FIG. 1C, above) for analysis.

In STEP 305, a set of frames is selected from the video advertisement according to a predefined selection procedure. This predefined selection procedure can involve any mechanism for optimizing logo detection. Due to resource constraints of the deep learning model service, it may not be feasible to perform logo detection on every frame of the video (or every segment of an audio). Accordingly, a subset of the frames may be selected for analysis. In one embodiment, the frames can be selected by initially identifying discrete segments of the video based on a rate of motion associated with each frame. Thus, each segment would ideally represent a relatively static or less variable portion of the video with respect to movement. From each of these segments, a set of consecutive frames is selected for analysis. Alternatively, the discrete segments can each represent a fixed number of frames and, collectively, the segments may constitute only a portion of the total frames in the video. In this embodiment, all frames in the identified segments are selected for analysis.

In STEP 310, the selected set of frames are analyzed by a deep learning model service to determine one or more candidate entity/probability pairs associated with each of at least a subset of the set of frames. The deep learning model service can utilize a neural-network based approach to object detection. Other object detection techniques may be utilized in various embodiments of the invention.

In STEP 315, a voting selection procedure is executed using the candidate entity/probability pairs associated with each of the subset of frames to designate a highest likelihood entity/probability pair (or pairs) for the video advertisement. Voting can involve using one or more hyperparameter values to exclude some of the candidate entity/probability pairs. For example, the process can involve looking at commonalities among the candidate entity/probability pairs in order to calculate aggregate entity/probability values across all of the analyzed frames. A weighted average of each candidate entity/probability can then be calculated by applying the aggregate entity/probability values. In this way, even high probability pairs can be excluded if they are outliers in terms of aggregate heuristics. The aggregate entity/probability pairs can utilize a different entity than the entities identified in the analysis. For example, the aggregate analysis can focus on groupings or categories of entities such as an industry (e.g., the industry of automobile manufacturing) versus the model identified entities corresponding to each frame (e.g., a specific manufacturer). In this way, in one example, the process may exclude a food service company from the final set of entity/probability pairs in the case that the aggregate analysis determines that the video is highly correlated with the pharmaceutical industry. FIG. 7 depicts an example of a pseudocode algorithm for the voting selection procedure. The algorithm can be executed using a set of predefined hyperparameters that have been selected ("tuned") for the given model.

In STEP 320, after the voting procedure, a highest ranking set of one or more entity/probability pairs is associated with the video advertisement and stored in a repository for subsequent usage (e.g., in advanced frequency management techniques described herein).

Figure 4:
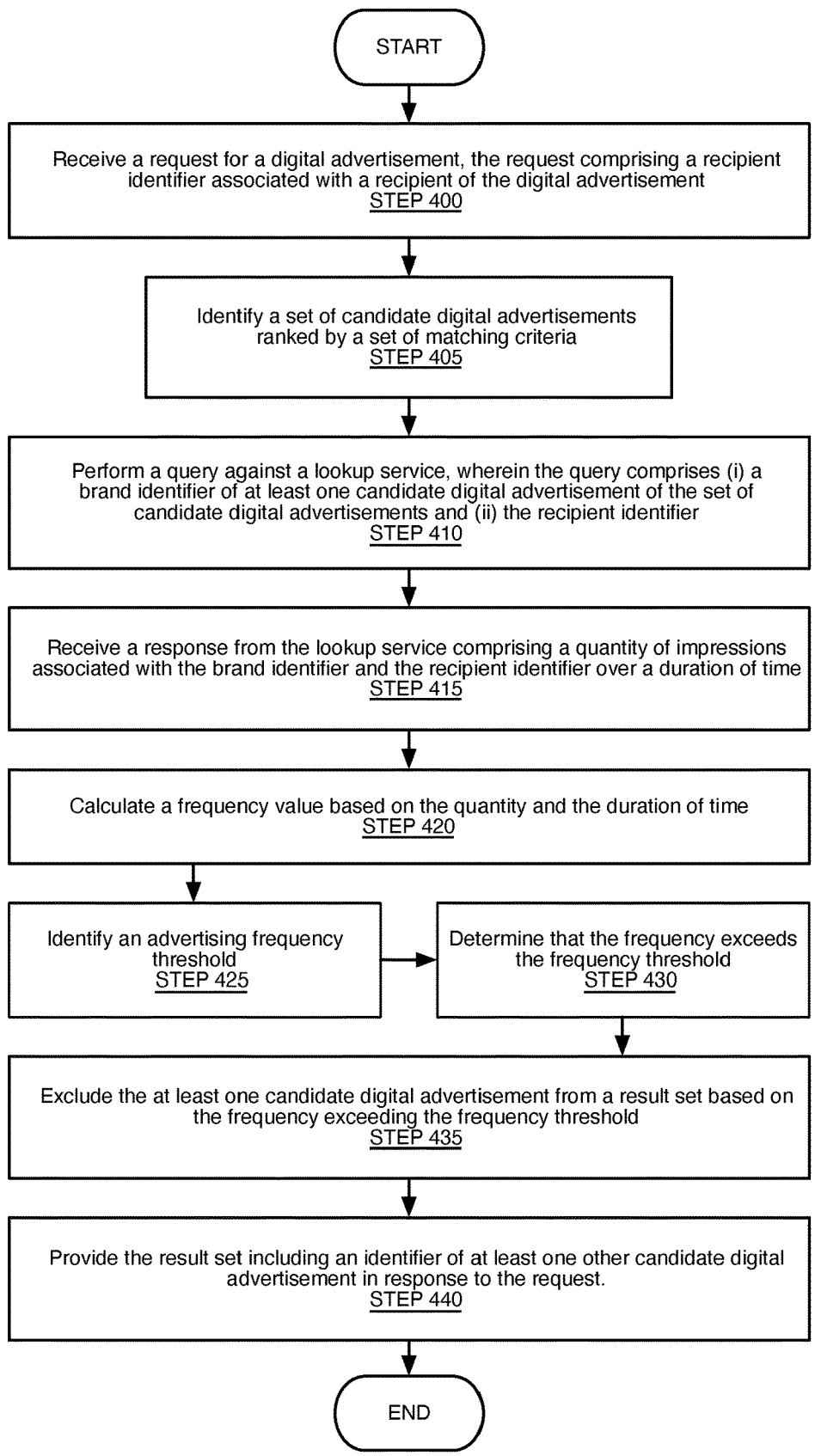

FIG. 4 shows a flowchart of a method for online advertisement serving using advanced frequency management. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 4 should not be construed as limiting the scope of the invention.

In STEP 400, a request for a digital advertisement is received. The request includes an identifier of a proposed recipient of the advertisement (e.g., an online advertising publisher). This request may be received by a component of an advertising platform configured to perform frequency management (e.g., frequency management service 111 of FIG. 1D, described above). The identifier can be one or more unique or semi-unique values selected for purposes of identifying and limiting the frequency of serving specific types of content (e.g., advertisements for a specific brand) to a grouping of end-user recipients or devices. For example, the identifier can be a unique device identifier (UDID), Internet protocol (IP) address, media access control (MAC) address, International Mobile Equipment Identity (IMEI), or any combination thereof.

In STEP 405, a set of candidate digital advertisements are ranked by a set of matching criteria. This matching can involve a realtime bidding (RTB) process designed to optimize the advertiser spend and/or may include relevance criteria for matching the advertisement to an end-user, in accordance with various embodiments of the invention.

In STEPS 410 and 415, a query is performed against a lookup service to determine a quantity of impressions associated with the entity (e.g., via a brand identifier) and the recipient identifier over a duration of time. For example, the quantity of impressions can represent the number of times a particular advertisement has been shown to a particular device. In one embodiment, the query includes a brand identifier (or any entity identifier) of at least one of the candidate digital advertisements and the recipient identifier (e.g., the publisher ID). Based on these inputs, the cached quantity of impressions can be identified, and used to calculate a frequency value (STEP 420) representing the rate at which this content (or content like it) has been shown to the recipient recently.

In STEP 420, a frequency value is calculated based on the quantity and the duration of time. The frequency value can be determined using a simple formula of quantity divided by the duration of time. In one or more embodiments, multiple quantities and durations are obtained from the lookup service in STEPS 410 and 415, each corresponding to a separate duration of time. In this way, the process can set and enforce multiple frequency limits corresponding to these various durations. Alternatively, in one embodiment, STEP 420 is optional and a frequency value is not calculated or needed. In this case, in STEP 430, the quantity values are compared against a "frequency threshold" which simply constitutes a quantity limit for the corresponding duration (s).

In STEP 425, a frequency threshold is identified. The frequency threshold may correspond to a maximum quantity of impressions divided by a specific duration of time. In other embodiments, the frequency threshold constitutes only a maximum quantity of impressions, which is compared against quantities corresponding to a predefined duration of time. The frequency threshold can be any absolute or time-relative limit for ad impressions and may be usable in more complex business logic in setting and determining limits for the serving of content to an end user device.

In STEP 430, it is determined that the frequency equals or exceeds the frequency threshold. For example, given a publisher who has received three ad impressions for a given brand within the last twenty-four hours, and assuming that the frequency threshold for this publisher is three ad impressions within the trailing twenty-four hour period, it can be determined that the frequency threshold is met. Frequency thresholds can correspond to a per-publisher, category, industry, a set of related brands, or any other grouping, in accordance with various embodiments.

In STEP 435, at least one candidate digital advertisement is excluded from a result set based on the frequency meeting (or in some embodiments exceeding) the frequency threshold. As the candidate digital advertisements are evaluated, multiple factors may be used for determining whether or not to include them in the result set. Candidate digital advertisements for which the frequency threshold is met/exceeded would be excluded, or in some embodiments, further evaluated using the aforementioned additional factors (e.g., demographic matching, preference filtering, geolocation filtering, etc.). Thus, the result set can be constructed by evaluating the candidate digital advertisements for inclusion according to various criteria.

In STEP 440, the result set is provided in response to the request. In one or more embodiments of the invention, the result set can be constrained by one or more paging parameters such that a maximum number of results, a paging index value indicating an offset, and multiple other features of an application programming interface (API) are utilized for serving the result set. Thus, the result set can include zero or more results, up to a maximum number defined by an API contract, for example. In one embodiment, only a single digital advertisement is selected for the result, and is subsequently matched by an RTB advertising platform to serve to the publisher identified by the recipient identifier. Furthermore, in various embodiments, the quantity of impressions for any digital advertisement that is ultimately served to the publisher is incremented to account for the impression.

In one example, the selection of candidate digital advertisements (STEP 405) occurs prior to the frequency lookup of STEP 415. An alternative and potentially more efficient approach, in one embodiment of the invention, is to exclude certain advertisements from consideration for ranking in STEP 405 by caching the frequency value(s) associated with each advertisement/entity/publisher combination in a separate repository, and using that cache to pre-select only advertisements that do not exceed the frequency threshold of STEP 430 for the set of candidate advertisements. Thus, in this way, additional caching and storage features can enable faster and more performant implementation. Due to the nature of the process described by FIG. 4, embodiments of the invention require the steps of this process to take place inside the response loop, and in real time. Accordingly, the process must be sufficiently fast, efficient, and reliable to service requests in time-sensitive applications like RTB.

Figure 5:
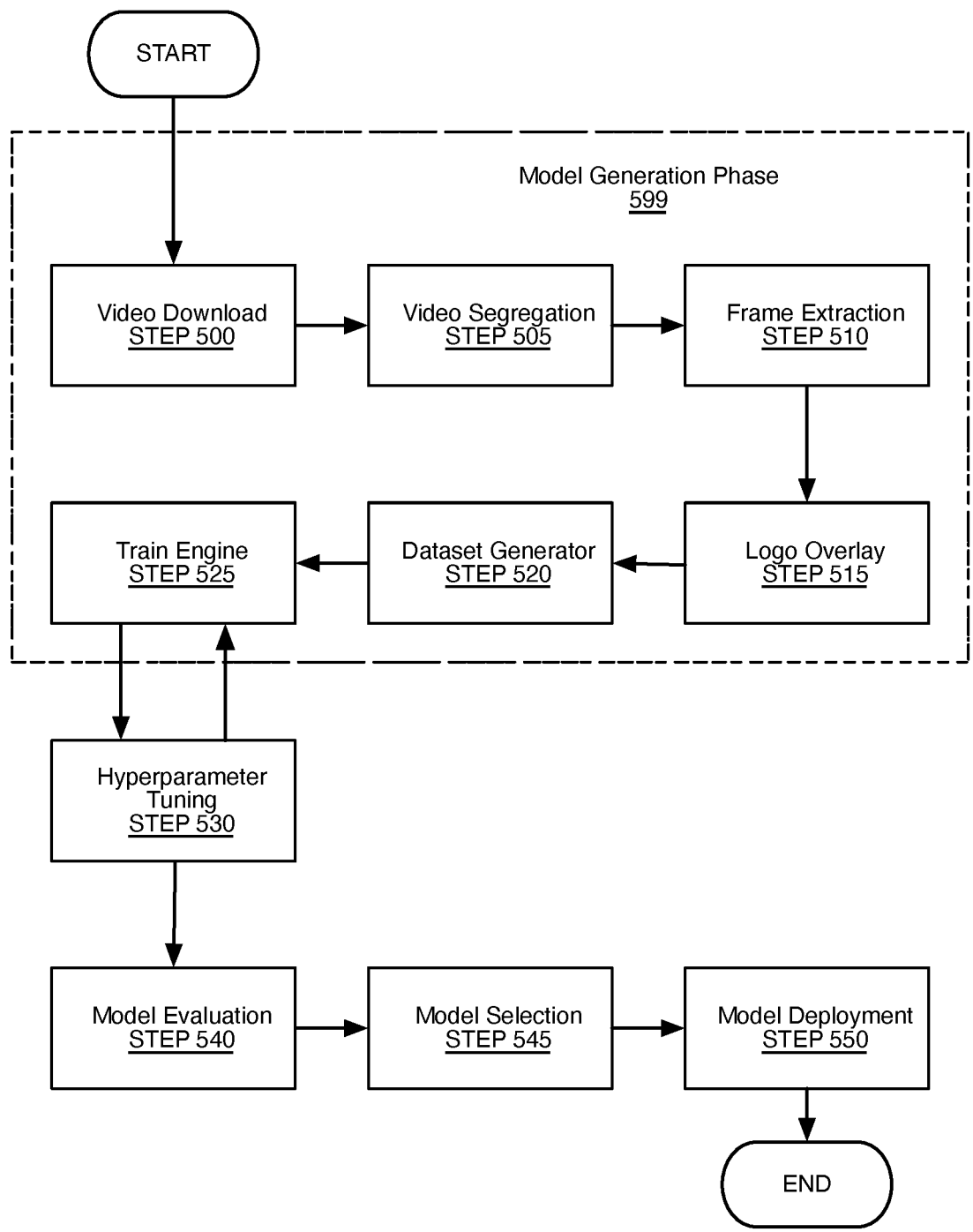

FIG. 5 shows a flowchart of a method for training and deployment of an artificial intelligence model. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

In STEP 500, a set of videos are downloaded for analysis. In one embodiment, a worker queue stores work items that are queued for training data generation. A worker process pulls a work item off the queue for processing. The work item defines a URL to the video, which is stored in an advertising repository or externally hosted (e.g., by the advertiser or and advertising platform). The work item can identify any number of videos such that the process functions on batches of related video content for training models on different groupings or categories of training data.

In STEP 505, the videos are segregated. The videos in each batch can be split into multiple sets according to a random or other selection algorithm. For example, separate data sets can be created for generation of training, validation, and test data. The training set of videos is used to train the model, the validation set of videos is used to evaluate and tune the model during model generation, and the test set of videos is used to evaluate the fully generated and tune model and to compare competing models.

Separate sets of videos may be utilized for training, test, and validation. In one or more embodiments of the invention, test and/or validation data sets can comprise real world data, while the training data set can comprise programmatically generated data or a combination of real-world data and programmatically generated data. In other embodiments, programmatically generated data is also used for validation. STEPS 510 and 515 are performed for each video in the training data set in order to programmatically generate the training set in STEP 520.

In STEP 510, frame extraction is performed on each video. Frame extraction involves selecting a subset of frames of the video for purposes of training data generation. These frames may be selected in random consecutive segments, or may be selected according to a predefined selection procedure. The following is an example of a selection procedure, in one embodiment of the invention:

1) Beginning at the first frame of the video, progress sequentially through the frames and calculate a delta value representing a difference between the two frames. The difference can involve a comparison of feature vectors between the two frames, for example. The process can be configured to rank the videos based on variation of color/content between frames and also to potential surface areas for more realistic placement of a logo image. In this way, the lower delta value represents less variation between the two frames and a better candidate for placement of the logo image.

2) Analyze the array of calculated delta values to identify segments with low consecutive sequences of delta values representing good candidates for logo placement.

In one or more embodiments of the invention, the above selection procedure, or any alternative selection procedure produces sets of frames selected from the video, the sets of frames being a subset of the total frames in the video.

In STEP 515, a logo image for a particular entity (e.g., a brand) is overlayed onto each set of frames for the video. A separate logo image may be utilized for one or more of the sets of frames, or a single logo image may be utilized for all sets, in accordance with various embodiments. The logo image may be transposed, rotated, color modified, or otherwise transformed to match each frame upon which it is being overlayed. Furthermore, in one embodiment, the location of the overlayed logo image may be selected according to a procedure for identifying surface areas in each frame. The frames are then re-inserted back into the original video in order to produce a training video including the overlayed frames. STEPS 500-515, in one or more embodiments of the invention, are collectively referred to as Model Generation Phase 599.

In STEP 525, after the entire training set of overlayed videos is generated, the training set is utilized to train an artificial intelligence model. In one embodiment, the model is trained to generate the highest precision and recall values for the given dataset. The process of training the model may involve parameter tuning. For example, various mathematical operations and processes such as gradient descent can be utilized in order to maximize the fit of prediction data to the ground truth.

In STEP 530, the hyperparameter space is analyzed, using one or more validation data sets, to find a set of hyperparameter values that result in the best performance of the model. Performance can be measured using metric values representing predefined criteria such as precision and recall. The model is executed against a subset of frames of the video which are again selected using a predefined selection procedure (which can, in one embodiment, be random). Once the frames are selected for analysis, the model generates an array of entity/probability pairs, each corresponding to an entity detected in one of the analyzed frames.

Hyperparameter tuning can include iteratively or concurrently executing one or more algorithms with different hyperparameter values as inputs, in order to identify the set of hyperparameter values that results in the best performance for the given model. The algorithm can, for example, use the hyperparameter values to detect false positives or otherwise modify the result set of the model execution (e.g., see the exemplary algorithm described in FIG. 7). In the example of FIG. 7, using the depicted hyperparameter algorithm, the entity/probability pairs of each training video are pruned to remove false positives, outliers, or weak-confidence pairs and to produce a final result set.

In STEP 540, a final set of metric values is obtained for each candidate model. Based on the metric values, the highest scoring model is selected in STEP 545. The model is then deployed to a production service in STEP 550. For example, the model may reside in memory within an application service (e.g., deep learning model service 119 of FIG. 1C, discussed above) executing inside of a container orchestration service such as a Kubernetes cluster. Various other application delivery, containerization, and orchestration platforms can be used, in accordance with various embodiments.

FIGS. 2 and 5 both describe processes for generation and usage of training data for purposes of enabling advanced frequency management techniques described herein. These processes may optionally overlap and/or describe the same or substantially similar steps.

Figure 6:
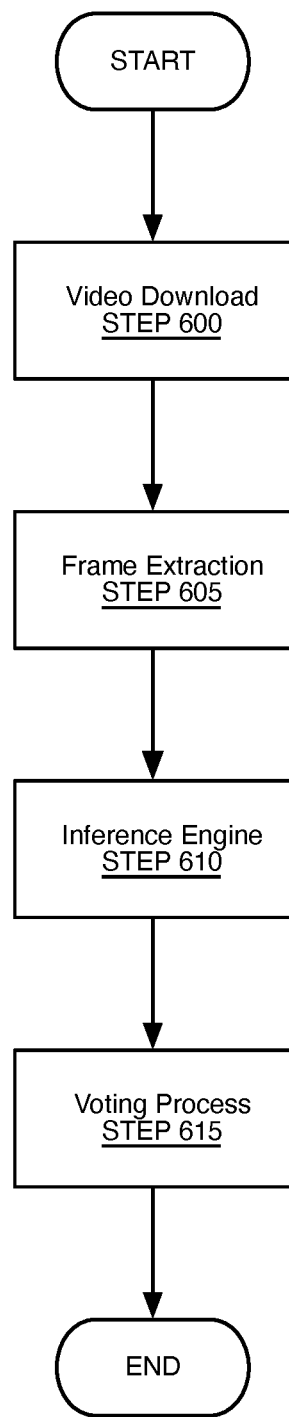

FIG. 6 shows a flowchart of a method for a logo detection inference pipeline (model serving), in accordance with various embodiments of the invention. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6 should not be construed as limiting the scope of the invention.

In STEP 600, a video is downloaded or obtained, similar to STEP 500 of FIG. 5. In this process, the video may be obtained from a queueing system whereby media files associated with one or more advertisements are queued for transcoding and analysis.

In STEP 605, frame extraction is performed on the video. A subset of the frames of the video may be selected randomly or based on a predefined selection procedure. One or more sets of frames, each comprising consecutive segments of the video, may be selected. In one embodiment, the frames are selected based on their likelihood of including detectable objects. For example, pre-filtering of the frames is performed to exclude frames comprising largely one color, frames with little or minimal edge detection, frames with contrast below a defined contrast threshold, and/or frames with consecutive difference value beyond a predefined threshold.

In STEP 610, an inference process is performed upon the extracted frames. In one or more embodiments of the invention, the inference process involves utilizing an artificial intelligence model to detect one or more entities (e.g., a logo, a representative object, etc.) in each of the selected frames. The model may be configured to return an entity/probability pair for each frame.

In one embodiment of the invention, the inference process involves calculating a fingerprint of the media item. The fingerprint can be any representation of the media item that is calculated deterministically, semi-deterministically, or partially deterministically, in accordance with various embodiments. For example, the fingerprint can be a hash value of the media file or a portion thereof. The inference process then proceeds with comparing the fingerprint against a repository of fingerprints. The searching process can be a fuzzy or exact comparison. If the search results in at least one match, or a partial match exceeding a predefined matching threshold, the inference process uses the media item corresponding to the matched video as a proxy for the video selected in STEP 600. In this way, the process uses the entity/probability pair corresponding to the proxy video to perform frequency management for the selected video, without the need to perform a full model analysis for the selected video (and the process ends).

In STEP 615, a voting process is performed by analyzing the entity/probability pairs in order to prune any potential false positives. The voting process involves executing a heuristic algorithm on the entity/probability pairs for the analyzed frames of the video. The result of the voting algorithm may be to prune (i.e., exclude) one or more of those probabilities from the final analysis of the video. The algorithm utilizes one or more hyperparameter values which have been tuned for the given model during training and evaluation of the model. One example of the voting process is the algorithm depicted by FIG. 7.

Lastly, the remaining entity/probability pairs are aggregated into one (or a small number of) entity/probability pair representing the entire video. Examples of the algorithm for calculating the final entity/probability pair include, but are not limited to, selecting a highest entity/probability value, aggregating probabilities of common entities (optionally by weighting them by their frequency of occurrence), and/or by weighting each entity/probability value by matching it to one or more context associated with the video (e.g., industry, type, category, etc).

FIG. 7 shows a flowchart of a method for voting to eliminate or reduce potential false positives among a set of entity/probability pairs associated with frames of a video, in accordance with various embodiments of the invention. The method utilizes hyperparameter values as inputs, and can be utilized to optimize said values in a process known as hyperparameter tuning. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 7 should not be construed as limiting the scope of the invention.

The method begins by receiving a set of candidate entity/probability pairs and two hyperparameter values. The first hyperparameter value, "score threshold", represents a minimum confidence score required to consider the detection of an entity valid. The second hyperparameter value, "count threshold", represents a minimum number of valid detections within the candidate pairs in order for an entity to be included in the result set. Pruned candidate pairs may represent false positives.

The hyperparameter values are selected and modified repeatedly in a process known as hyperparameter tuning. Each iteration of the process is compared against other iterations in order to select a final set of hyperparameters that result in the best performance for the given model. Hyperparameters can be entity-specific, industry-specific, or global, in accordance with various embodiments.

In this process, the term "label" represents an entity identifier (e.g., an identifier of a brand). Firstly, two objects are instantiated: stats and results. Each is a multi-dimensional array, with stats being used to aggregate intermediary values within the function, and results representing the result set of entity/probability pairs with false positives pruned. The process evaluates one candidate pair at a time (beginning on line 4). The candidate pair's label and score are stored in local variables on lines 5 and 6. On line 7, if the score of the current candidate is greater than or equal to that of the score threshold, the process increments the valid count (initiated to zero) of the entity in the stats array.

The process continues by iterating over the stats array by entity (line 11). At this point, the stats array includes a count of valid occurrences of each entity. If the stats count for the selected entity is greater than or equal to the count threshold, the identified entity and its valid count are stored in the results array. The process ends by returning the results array, sorted by average score. Thus, the entity with the highest number of valid detections is the first element of the results array. Downstream processes may utilize only the first element/entity, or may utilize an arbitrary number of highest ranking entities from the result set for storage in a transcoded media repository.

In one or more embodiments, methods for generating training data (e.g., including STEPs 250-256 of FIG. 2), methods for model serving (e.g., including STEPs 305-315 of FIG. 3), and methods of performing frequency management (e.g., including STEPS 405-435 of FIG. 4) may be performed either sequentially or in parallel. It should be appreciated that in one or more embodiments, the steps of FIG. 2 can be executed by the same or different module(s) (or processors) from the module(s) (or processors) executing the steps of FIG. 3 or 4.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 8:
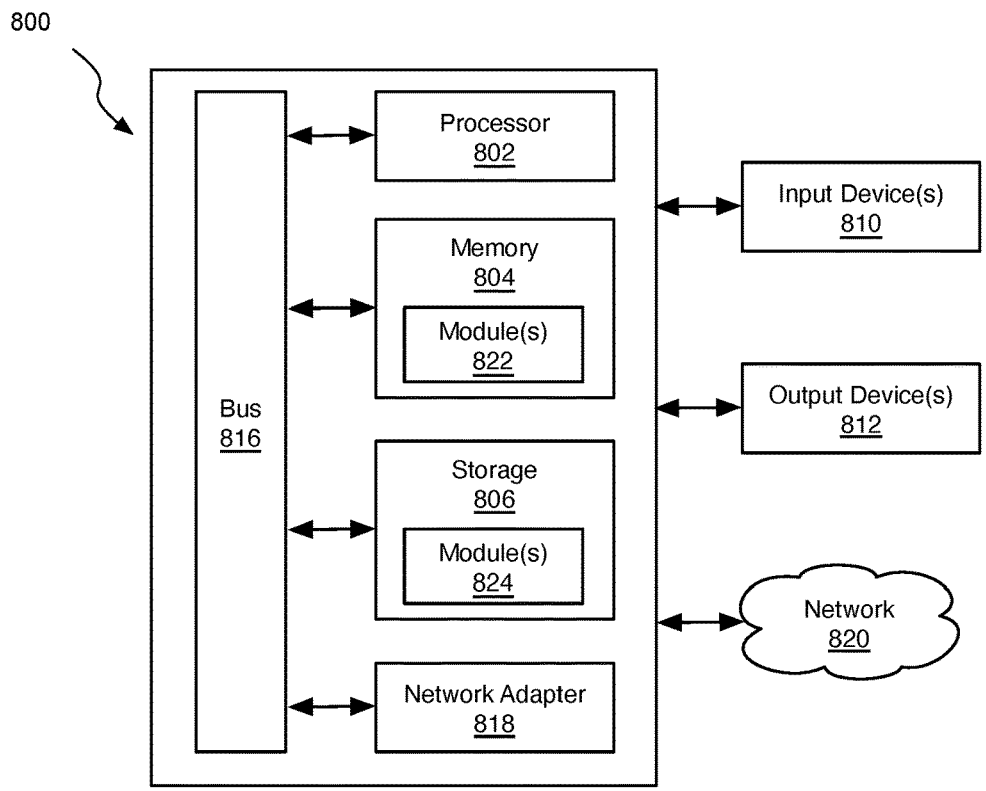
FIGS. 8 and 9 show a computing system and network architecture in accordance with one or more embodiments.

For example, as shown in FIG. 8, the computing system 800 may include one or more computer processor(s) 802, associated memory 804 (e.g., random access memory (RAM), cache memory, flash memory, etc.), one or more storage device(s) 806 (e.g., a hard disk, an optical drive such as a compact disk (CD) drive or digital versatile disk (DVD) drive, a flash memory stick, etc.), a bus 816, and numerous other elements and functionalities. The computer processor(s) 802 may be an integrated circuit for processing instructions. For example, the computer processor(s) may be one or more cores or micro-cores of a processor.

In one or more embodiments, the computer processor(s) 802 may be an integrated circuit for processing instructions. For example, the computer processor(s) 802 may be one or more cores or micro-cores of a processor. The computer processor(s) 802 can implement/execute software modules stored by computing system 800, such as module(s) 822 stored in memory 804 or module(s) 824 stored in storage 806. For example, one or more of the modules described herein can be stored in memory 804 or storage 806, where they can be accessed and processed by the computer processor 802. In one or more embodiments, the computer processor(s) 802 can be a special-purpose processor where software instructions are incorporated into the actual processor design.

The computing system 800 may also include one or more input device(s) 810, such as a touchscreen, keyboard, mouse, microphone, touchpad, electronic pen, or any other type of input device. Further, the computing system 800 may include one or more output device(s) 812, such as a screen (e.g., a liquid crystal display (LCD), a plasma display, touchscreen, or other display device), a printer, external storage, or any other output device. The computing system 800 may be connected to a network 820 (e.g., a local area network (LAN), a wide area network (WAN) such as the Internet, mobile network, or any other type of network) via a network interface connection 818. The input and output device(s) may be locally or remotely connected (e.g., via the network 820) to the computer processor(s) 802, memory 804, and storage device(s) 806.

One or more elements of the aforementioned computing system 800 may be located at a remote location and connected to the other elements over a network 820. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 9:
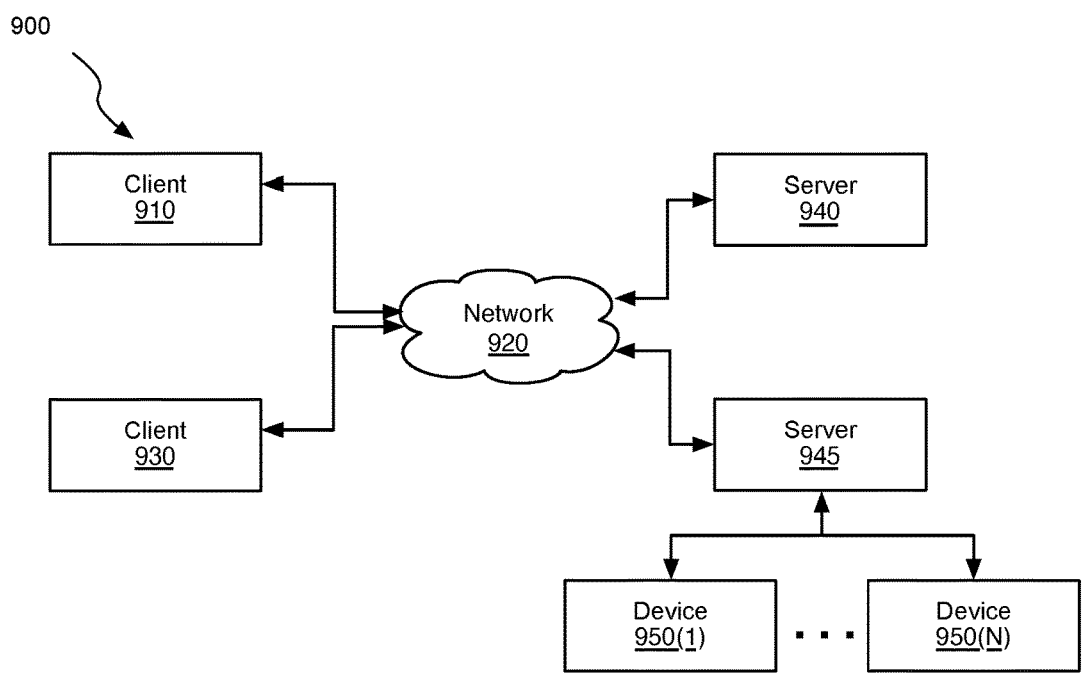

FIG. 9 is a block diagram of an example of a network architecture 900 in which client systems 910 and 930, and servers 940 and 945, may be coupled to a network 920. Network 920 may be the same as or similar to network 820. Client systems 910 and 930 generally represent any type or form of computing device or system, such as client devices (e.g., portable computers, smart phones, tablets, smart TVs, etc.).

Similarly, servers 940 and 945 generally represent computing devices or systems, such as application servers or database servers, configured to provide various database services and/or run certain software applications. Network 920 generally represents any telecommunication or computer network including, for example, an intranet, a wide area network (WAN), a local area network (LAN), a personal area network (PAN), or the Internet.

With reference to computing system 800 of FIG. 8, a communication interface, such as network adapter 818, may be used to provide connectivity between each client system 910 and 930, and network 920. Client systems 910 and 930 may be able to access information on server 940 or 945 using, for example, a Web browser, thin client application, or other client software. Such software may allow client systems 910 and 930 to access data hosted by server 940, server 945, or storage devices 950(1)-(N). Although FIG. 9 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 940, server 945, storage devices 950(1)-(N), or any combination thereof. All or a portion of one or more of the example embodiments disclosed herein may also be encoded as a computer program, stored in server 940, run by server 945, and distributed to client systems 910 and 930 over network 920.

Although components of one or more systems disclosed herein may be depicted as being directly communicatively coupled to one another, this is not necessarily the case. For example, one or more of the components may be communicatively coupled via a distributed computing system, a cloud computing system, or a networked computer system communicating via the Internet.

And although only one computer system may be depicted herein, it should be appreciated that this one computer system may represent many computer systems, arranged in a central or distributed fashion. For example, such computer systems may be organized as a central cloud and/or may be distributed geographically or logically to edges of a system such as a content/data delivery network or other arrangement. It is understood that virtually any number of intermediary networking devices, such as switches, routers, servers, etc., may be used to facilitate communication.

While the invention has been described with respect to a limited number of embodiments, those skilled in the art, having benefit of this disclosure, will appreciate that other embodiments may be devised that do not depart from the scope of the invention as disclosed herein.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

What is claimed is:

1. A system for entity detection using artificial intelligence, comprising:
   a computer processor;
   a deep learning model service executing on the computer processor and configured to enable the computer processor to:
   select a set of frames from a media item according to a predefined selection procedure;
   analyze the set of frames to determine a set of candidate brand-probability pairs, each associated with one frame of the set of frames;
   a voting engine configured to execute a voting selection procedure, comprising:
   obtaining, as an input to the voting selection procedure, at least one hyperparameter value representing a threshold for determining whether candidate brand-probability pairs are to be included in a result set;
   determining that a first brand-probability pair of the set of candidate brand-probability pairs does not meet the threshold;
   excluding the first brand-probability pair from the result set based on determining that the first brand-probability pair does not meet the threshold;
   sorting the result set by a count of occurrences of each brand of the candidate brand-probability pairs in the set of frames; and
   selecting at least one final brand-probability pair from the result set; and
   an offline transcoding service configured to:
   store the final brand-probability pair in a repository with a relation to an identifier of the media item, wherein the repository is configured to query for the final brand-probability pair by the identifier of the media item; and
   a frequency management service configured to:

receive a request for a digital advertisement, the request comprising a recipient identifier;

identify a candidate digital advertisement obtained from a realtime bidding service;

identify a brand identifier associated with the candidate digital advertisement, wherein the brand identifier corresponds to the final brand-probability pair stored in the repository;

perform a query against the repository, wherein the query comprises the brand identifier and the recipient identifier;

receive a response from the repository comprising a quantity of impressions associated with the brand identifier and the recipient identifier over a duration of time;

determine that the quantity of impressions exceeds a predefined frequency management limit; and exclude the candidate digital advertisement from a result set provided for display by a client device associated with the recipient identifier.

2. The system of claim 1, further comprising:

a frequency management service configured to:
receive a request for a digital advertisement, the request comprising a recipient identifier;
identify a candidate digital advertisement obtained from a realtime bidding service;

an online transcoding service configured to:
obtain a fingerprint of the digital advertisement;
query a transcoding repository with the fingerprint of the digital advertisement;
obtain a result for the query indicating that the digital advertisement is not transcoded in the transcoding repository; and
queue the digital advertisement for transcoding.

3. The system of claim 1, wherein the predefined selection procedure comprises:
calculating a ranking score for each frame of the media item based on at least one general characteristic;
sorting each of the frames of the media item by their ranking score; and
selecting the set of frames based on the sorted frames of the media item.

4. The system of claim 1, wherein the identifier of the media item is a fingerprint calculated using a deterministic algorithm.

5. The system of claim 4, wherein the deterministic algorithm matches multiple similar media items to a same fingerprint.

6. The system of claim 1, wherein the threshold is a tuned hyperparameter value.

7. The system of claim 1, wherein the offline transcoding service is further configured to store multiple brand probability pairs in the repository with the relation to the identifier of the media item.

8. The system of claim 1, wherein probabilities of the candidate brand-probability pairs each represent at least one selected from a group consisting of (i) a likelihood that the media item contains an associated entity and (ii) a strength of association between an entity and the media item.

9. A method for entity detection using artificial intelligence, comprising:
selecting a set of frames from a media item according to a predefined selection procedure;
analyzing, using at least one computer processor, the set of frames to determine a set of brand-probability pairs, each associated with one frame of the set of frames;
executing a voting selection procedure, comprising:
obtaining, as an input to the voting selection procedure, at least one hyperparameter value representing a threshold for determining whether candidate brand-probability pairs are to be included in a result set;
determining that a first brand-probability pair of the set of candidate brand-probability pairs does not meet the threshold;
excluding the first brand-probability pair from the result set based on determining that the first brand-probability pair does not meet the threshold;
sorting the result set by a count of occurrences of each brand of the candidate brand-probability pairs in the set of frames; and
selecting at least one final brand-probability pair from the result set; and
storing the final brand-probability pair in a repository with a relation to an identifier of the media item, wherein the repository is configured to query for the final brand-probability pair by the identifier of the media item;
receiving a request for a digital advertisement, the request comprising a recipient identifier;
identifying a candidate digital advertisement obtained from a realtime bidding service;
identifying a brand identifier associated with the candidate digital advertisement, wherein the brand identifier corresponds to the final brand-probability pair stored in the repository;
performing a query against the repository, wherein the query comprises the brand identifier and the recipient identifier;
receiving a response from the repository comprising a quantity of impressions associated with the brand identifier and the recipient identifier over a duration of time;
determining that the quantity of impressions exceeds a predefined frequency management limit; and
excluding the candidate digital advertisement from a result set provided for display by a client device associated with the recipient identifier.

10. The method of claim 9, further comprising:
receiving a request for a digital advertisement, the request comprising a recipient identifier;
identifying a candidate digital advertisement obtained from a realtime bidding service;
obtaining a fingerprint of the digital advertisement;
querying a transcoding repository with the fingerprint of the digital advertisement;
obtaining a result for the query indicating that the digital advertisement is not transcoded in the transcoding repository; and
queuing the digital advertisement for transcoding.

11. The method of claim 9, wherein the predefined selection procedure comprises:
calculating a ranking score for each frame of the media item based on at least one general characteristic;
sorting each of the frames of the media item by their ranking score; and
selecting the set of frames based on the sorted frames of the media item.

12. The method of claim 9, wherein the identifier of the media item is a fingerprint calculated using a deterministic algorithm.

13. The system of claim 12, wherein the deterministic algorithm matches multiple similar media items to a same fingerprint.

14. A non-transitory computer-readable storage medium comprising a plurality of instructions for entity detection using artificial intelligence, the plurality of instructions configured to execute on at least one computer processor to enable the at least one computer processor to:
- select a set of frames from a media item according to a predefined selection procedure;
- analyze the set of frames to determine a set of brand-probability pairs, each associated with one frame of the set of frames;
- execute a voting selection procedure, comprising:
  - obtaining, as an input to the voting selection procedure, at least one hyperparameter value representing a threshold for determining whether candidate brand-probability pairs are to be included in a result set;
  - determining that a first brand-probability pair of the set of candidate brand-probability pairs does not meet the threshold;
  - excluding the first brand-probability pair from the result set based on determining that the first brand-probability pair does not meet the threshold;
  - sorting the result set by a count of occurrences of each brand of the candidate brand-probability pairs in the set of frames; and
  - selecting at least one final brand-probability pair from the result set; and
- store the final brand-probability pair in a repository with a relation to an identifier of the media item, wherein the repository is configured to query for the final brand-probability pair by the identifier of the media item;
- receive a request for a digital advertisement, the request comprising a recipient identifier;
- identify a candidate digital advertisement obtained from a realtime bidding service;
- identify a brand identifier associated with the candidate digital advertisement, wherein the brand identifier corresponds to the final brand-probability pair stored in the repository;
- perform a query against the repository, wherein the query comprises the brand identifier and the recipient identifier;
- receive a response from the repository comprising a quantity of impressions associated with the brand identifier and the recipient identifier over a duration of time;
- determine that the quantity of impressions exceeds a predefined frequency management limit; and
- exclude the candidate digital advertisement from a result set provided for display by a client device associated with the recipient identifier.

15. The non-transitory computer-readable storage medium of claim 14, the plurality of instructions further configured to execute on the at least one computer processor to enable the at least one computer processor to:
- receive a request for a digital advertisement, the request comprising a recipient identifier;
- identify a candidate digital advertisement obtained from a realtime bidding service;
- obtain a fingerprint of the digital advertisement;
- query a transcoding repository with the fingerprint of the digital advertisement;
- obtain a result for the query indicating that the digital advertisement is not transcoded in the transcoding repository; and
- queue the digital advertisement for transcoding.

16. The non-transitory computer-readable storage medium of claim 14, wherein the predefined selection procedure comprises:
- calculating a ranking score for each frame of the media item based on at least one general characteristic;
- sorting each of the frames of the media item by their ranking score; and
- selecting the set of frames based on the sorted frames of the media item.

17. The non-transitory computer-readable storage medium of claim 14, wherein the identifier of the media item is a fingerprint calculated using a deterministic algorithm.

* * * * *